(12) United States Patent
Hallman et al.

(10) Patent No.: US 10,915,783 B1
(45) Date of Patent: Feb. 9, 2021

(54) DETECTING AND LOCATING ACTORS IN SCENES BASED ON DEGRADED OR SUPERSATURATED DEPTH DATA

(71) Applicant: Amazon Technologies, Inc., Seattle, WA (US)

(72) Inventors: Samuel Nathan Hallman, Seattle, WA (US); Petko Tsonev, Issaquah, WA (US); Michael Francis O'Malley, Seattle, WA (US); Jayakrishnan Eledath, Kenmore, WA (US); Jue Wang, Seattle, WA (US); Tian Lan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 16/220,461

(22) Filed: Dec. 14, 2018

(51) Int. Cl.
| | | |
|---|---|---|
| *G06K 9/62* | (2006.01) | |
| *G06K 9/00* | (2006.01) | |
| *G06N 3/08* | (2006.01) | |
| *G06T 5/50* | (2006.01) | |

(52) U.S. Cl.
CPC ....... *G06K 9/6202* (2013.01); *G06K 9/00208* (2013.01); *G06K 9/00362* (2013.01); *G06N 3/08* (2013.01); *G06T 5/50* (2013.01); *G06T 2207/10028* (2013.01)

(58) Field of Classification Search
CPC ....... G01B 11/026; G01B 11/22; G01S 17/10; G01S 17/89; G01S 7/4865; H04N 13/128; H04N 13/271; H04N 2013/0081; G06K 9/6202; G06K 9/00208; G06K 9/00362; G06N 3/08; G06T 5/50; G06T 2207/10028
See application file for complete search history.

(56) References Cited

U.S. PATENT DOCUMENTS

| | | |
|---|---|---|
| 6,035,717 A | 3/2000 | Carodiskey |
| 7,225,980 B2 | 6/2007 | Ku et al. |
| 7,362,419 B2 | 4/2008 | Kurihara et al. |

(Continued)

OTHER PUBLICATIONS

Li, Larry, "Time-of-Flight Camera—An Introduction," Technical White Paper, No. SLOA190B—Jan. 2014 (rev. May 2014), Copyright 2014, Texas Instruments, Inc., 10 pages.

(Continued)

*Primary Examiner* — Ian L Lemieux
(74) *Attorney, Agent, or Firm* — Athorus, PLLC

(57) ABSTRACT

An imaging device may capture images of a scene, where the scene includes retroreflective materials. Where visual images and depth images are captured from a scene, and the depth images have ratios of supersaturated pixels that are less than a predetermined threshold, a location map of the scene is generated or updated based on the depth images. Where the ratios are greater than the predetermined threshold, the location map of the scene is generated or updated based on the visual images. Additionally, where each of a plurality of imaging devices detect concentrations of supersaturated pixels beyond a predetermined threshold or limit within their respective fields of view, an actor present on the scene may be determined to be wearing retroreflective material, or otherwise designated as a source of the supersaturation, and tracked with the scene based on coverage areas that are determined to have excessive ratios of supersaturated pixels.

20 Claims, 33 Drawing Sheets

(56) References Cited

U.S. PATENT DOCUMENTS

| | | | |
|---|---|---|---|
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,103,663 B2 | 8/2015 | Min et al. | |
| 9,473,747 B2 | 10/2016 | Kobres et al. | |
| 9,894,347 B2 | 2/2018 | Yoon et al. | |
| 9,897,698 B2 | 2/2018 | Boufounos et al. | |
| 10,165,257 B2 | 12/2018 | Seshadrinathan et al. | |
| 10,368,053 B2* | 7/2019 | Martinez Bauza | G06T 7/521 |
| 10,473,785 B2 | 11/2019 | Kubota et al. | |
| 2003/0002712 A1 | 1/2003 | Steenburgh et al. | |
| 2004/0181467 A1 | 9/2004 | Raiyani et al. | |
| 2006/0197937 A1 | 9/2006 | Bamji et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2012/0177252 A1* | 7/2012 | Korekado | G01S 17/89 382/106 |
| 2012/0284132 A1 | 11/2012 | Kim et al. | |
| 2013/0076898 A1 | 3/2013 | Philippe et al. | |
| 2013/0169756 A1* | 7/2013 | Min | H04N 13/271 348/46 |
| 2013/0201288 A1 | 8/2013 | Billerbeck et al. | |
| 2013/0253700 A1 | 9/2013 | Carson et al. | |
| 2014/0279294 A1 | 9/2014 | Field-Darragh et al. | |
| 2014/0362223 A1 | 12/2014 | LaCroix et al. | |
| 2015/0019391 A1 | 1/2015 | Kumar et al. | |
| 2015/0073907 A1 | 3/2015 | Purves et al. | |
| 2016/0307325 A1* | 10/2016 | Wang | H04N 5/2256 |
| 2016/0330391 A1 | 11/2016 | Bulteel et al. | |
| 2017/0180658 A1 | 6/2017 | Choi et al. | |
| 2017/0180713 A1 | 6/2017 | Trail | |
| 2018/0045513 A1* | 2/2018 | Kitamura | G01S 17/894 |
| 2018/0307310 A1 | 10/2018 | Mccombe et al. | |
| 2019/0227174 A1* | 7/2019 | Hitomi | G01S 17/08 |
| 2019/0317217 A1* | 10/2019 | Day | G01S 17/58 |
| 2020/0077078 A1* | 3/2020 | Denenberg | G06T 7/85 |
| 2020/0090417 A1* | 3/2020 | Schloter | G06T 5/50 |

OTHER PUBLICATIONS

Moller, Tobias et al., "Robust 3D Measurement with PMD Sensors," Proceedings of the 1st Range Imaging Research Day at ETH, Zurich, Switzerland (2005), 14 pages.

Wikipedia, "Bracketing," URL: https://en.wikipedia.org/wiki/Bracketing (printed Jun. 27, 2018), 3 pages.

Perenzoni, M. and Stoppa, D., Figures of Merit for Indirect Time-of-Flight 3D Cameras: Definition and Experimental Evaluation, Remote Sensing, 2011, 3, 2461-2472; doi:10.3390/rs3112461, 12 pages.

Van Nieuwenhove, D., et al., Time-of-Flight Optical Ranging Sensor Based on a Current Assisted Photonic Demodulator, Proceedings Symposium IEEE/LEOS Benelux Chapter, 2006, Eindhoven, 4 pages.

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Christian Pop, "Introduction to the BodyCom Technology", Microchip AN1391, May 2, 2011, pp. 1-24, vol. AN1391, No. DS01391A, Publisher: 2011 Microchip Technology Inc.

Gokturk, S. B. et al. A Time-of-Flight Depth Sensor-System Description, 2004, (Year: 2004), 9 pages.

* cited by examiner

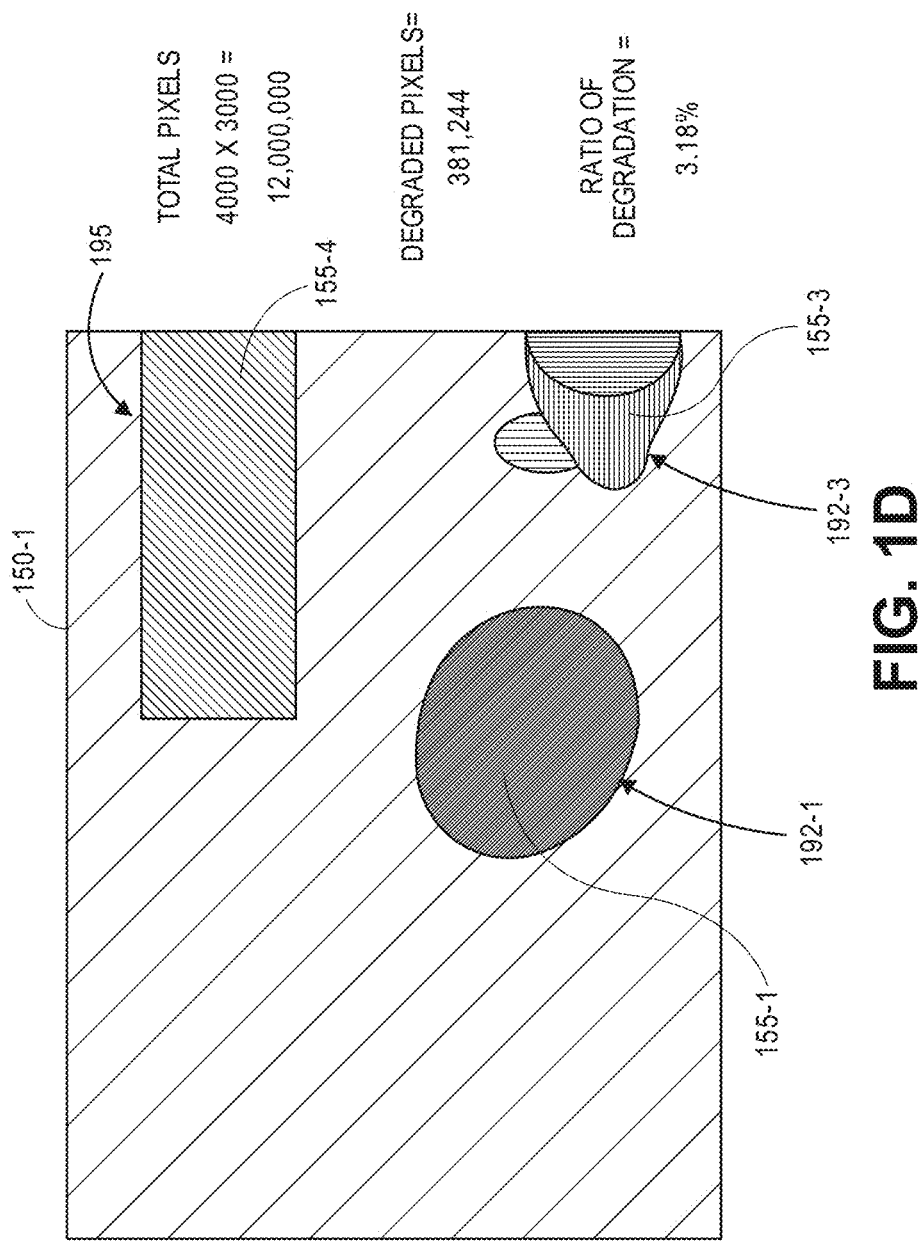

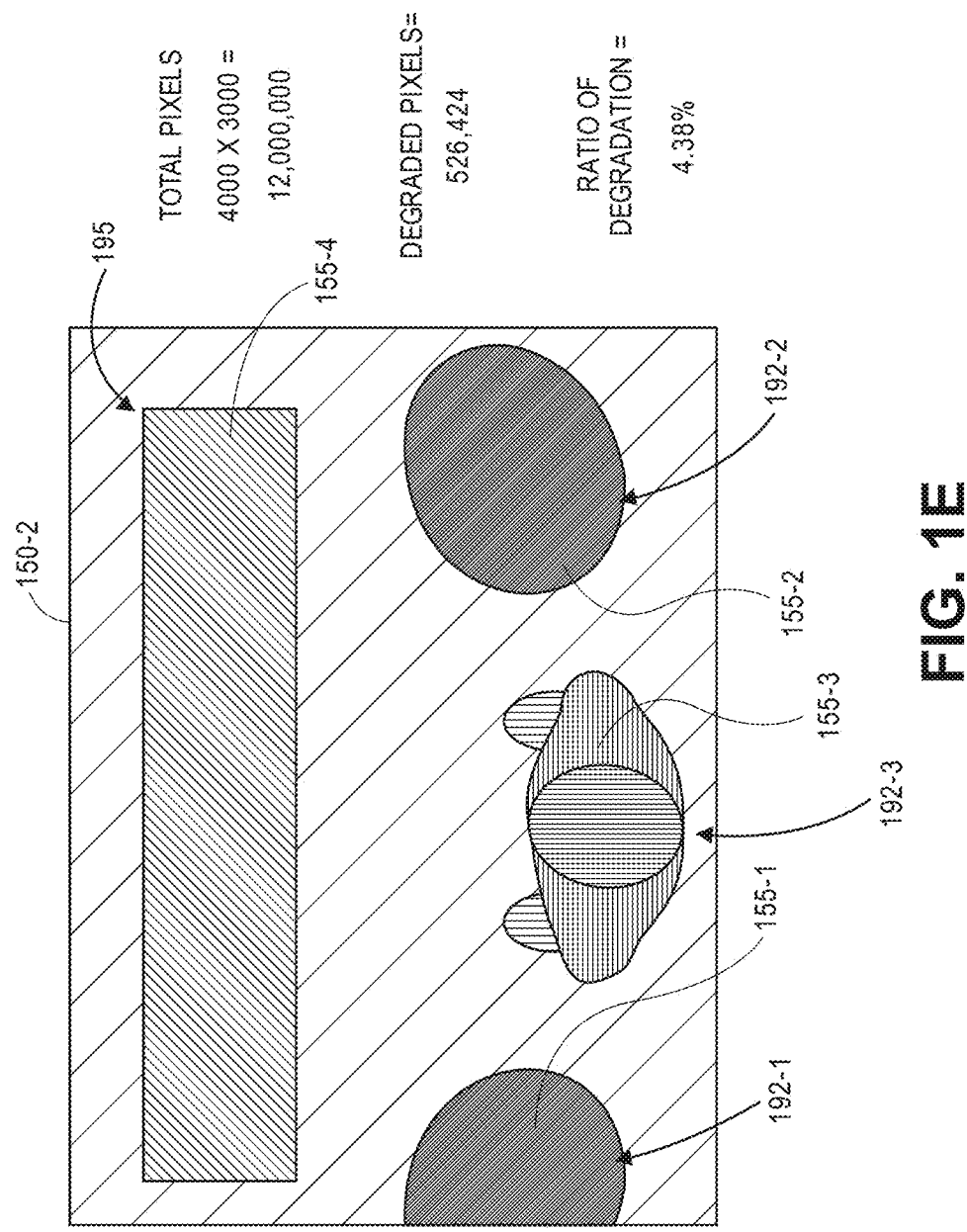

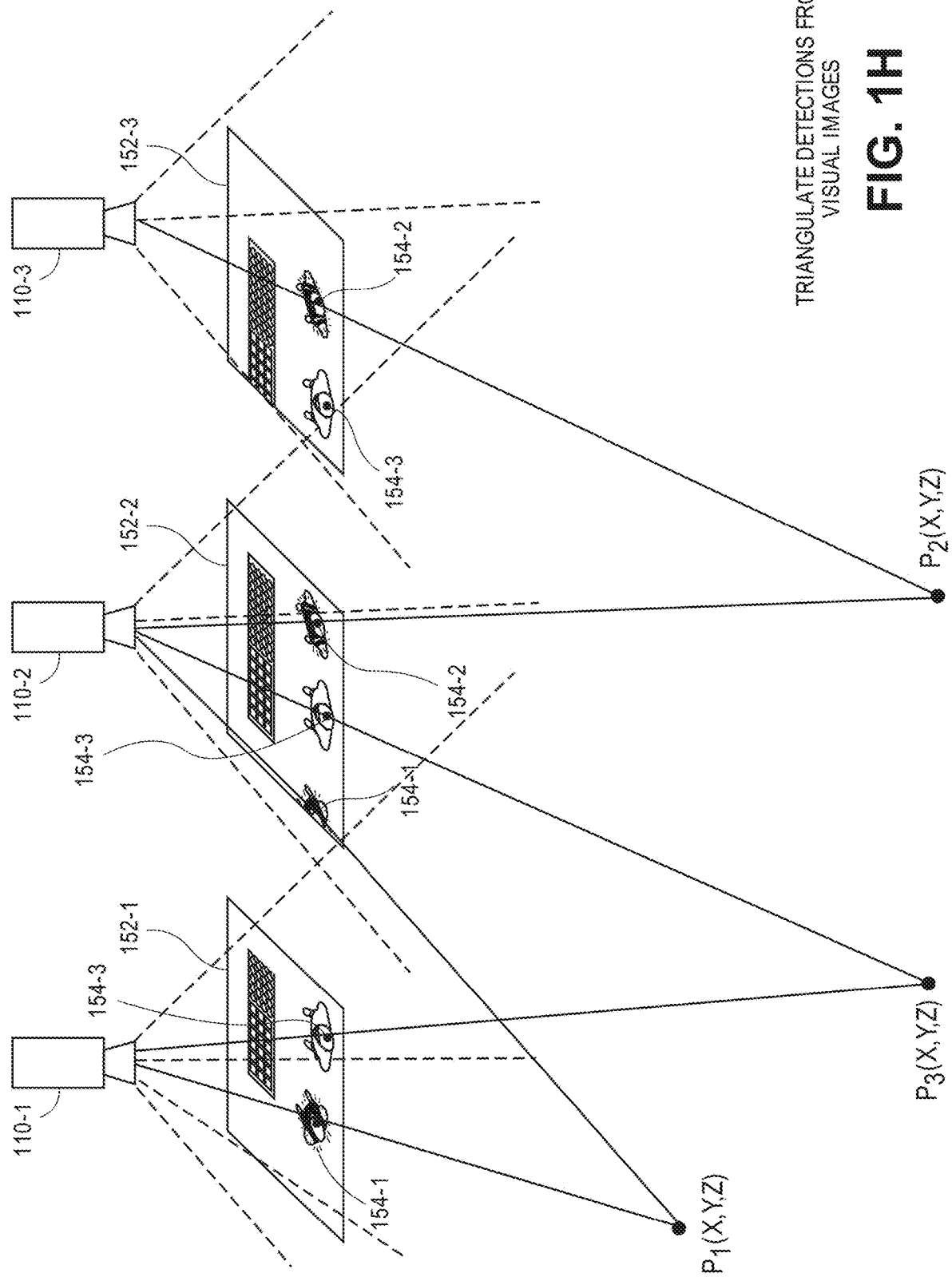

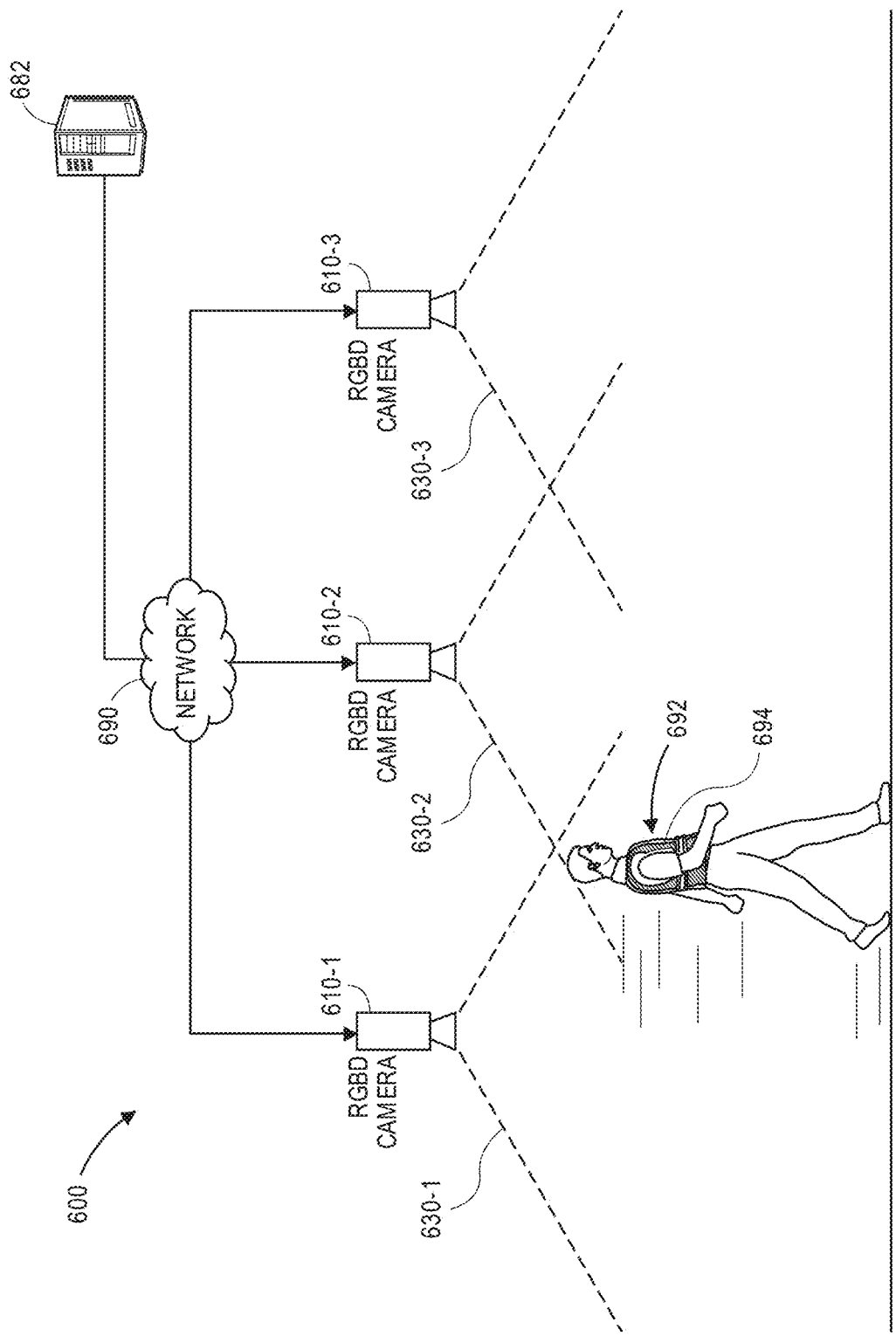

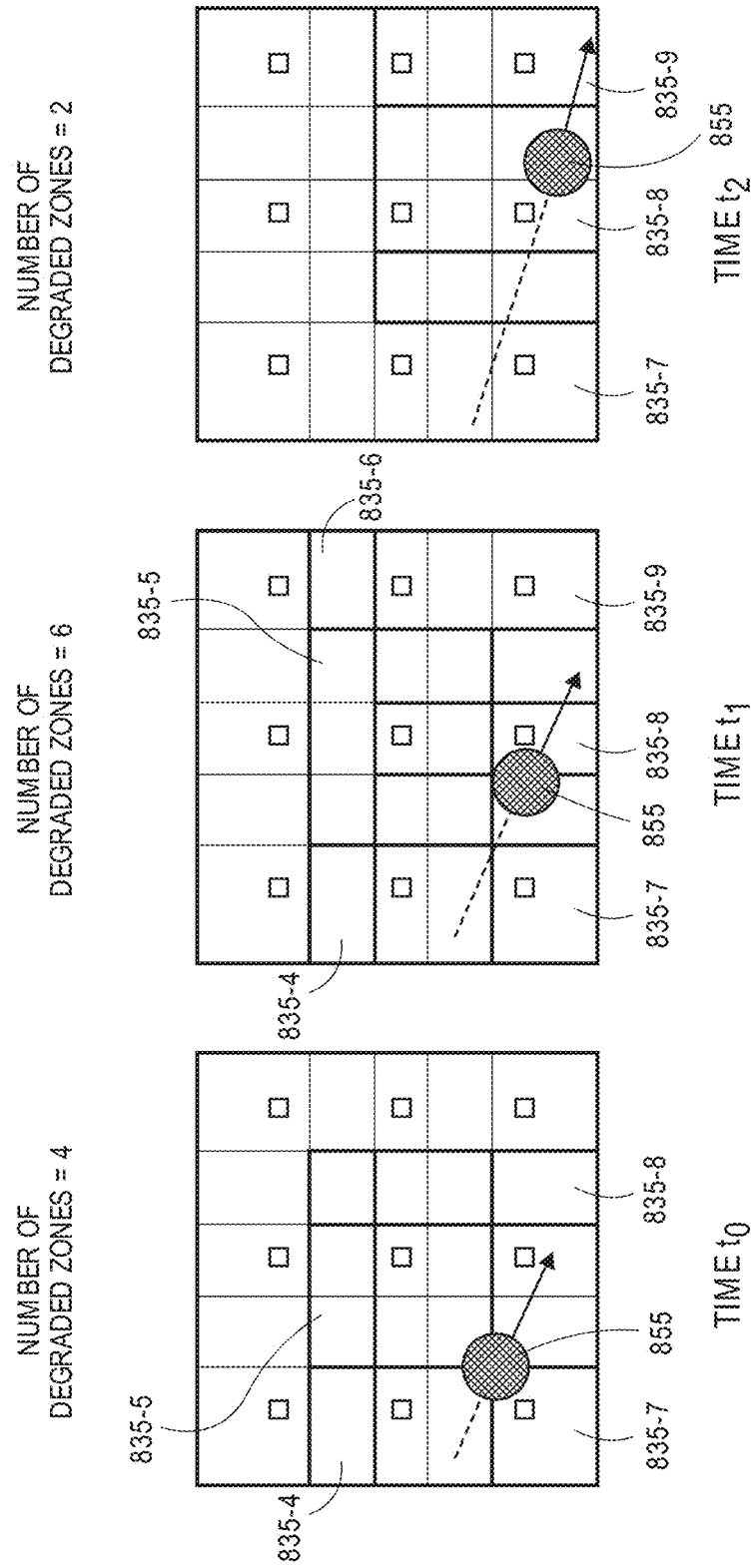

DETECTING AND LOCATING ACTORS IN SCENES BASED ON DEGRADED OR SUPERSATURATED DEPTH DATA

BACKGROUND

A "time-of-flight" camera is a depth-sensing or range-sensing system that operates by illuminating a scene using a light source (e.g., a modulated light source) and capturing light that is reflected from various points of the scene following the illumination. Time-of-flight cameras are typically equipped with an illuminator for illuminating a scene, and a sensor for capturing reflected light from the scene. The reflected light that is captured by a time-of-flight camera sensor may be interpreted to generate a depth image or profile of portions of the scene within a field of view of the time-of-flight camera. Some time-of-flight cameras may capture and interpret reflected light, and generate depth images or profiles of portions of scenes from such reflected light, several dozen times per second. Depth images or profiles generated by time-of-flight cameras can be very accurate.

In some applications, the effectiveness of a time-of-flight camera may be diminished where pixels of a depth image are degraded for any reasons, such as when one or more retroreflective materials are present within a field of view of the time-of-flight camera. A retroreflector is an object or surface that reflects light with minimal scattering, typically with rays having vectors that are parallel to and opposite in direction from a source of the light. Retroreflective materials are commonly used in applications where enhanced visibility is desired, such as by applying retroreflective materials to surfaces of objects of importance in areas or environments having varying weather or lighting conditions, e.g., safety cones, street signs, highway barriers, or road stripes. Retroreflective materials may also be worn by workers who operate in such areas. For example, protective or working clothing such as jackets, vests, pants, shirts, hats, gloves or the like may be formed from fabrics having one or more strips, bands, layers, panels or other sectors of retroreflective material. Alternatively, some such clothing may be formed from retroreflective material in their entirety.

In particular, retroreflectivity may cause pixel sensors of a time-of-flight camera to be saturated, which distorts or corrupts a set of depth data generated by the time-of-flight camera, and results in one or more distortions or corruptions within a depth image generated from the set of depth data. Retroreflective materials may therefore disrupt the processes by which depth images are generated for a scene using time-of-flight cameras, and result in the generation of depth images having substantially limited value. Pixels of the depth data may also be degraded where one or more aspects of the time-of-flight data are not operating properly for any other reason, such as where an illuminator or one or more pixel sensors are malfunctioning.

BRIEF DESCRIPTION OF THE DRAWINGS

FIGS. 1A through 1I are views of aspects of one system for detecting or locating actors in accordance with implementations of the present disclosure.

FIGS. 6A through 6E are views of aspects of one system for detecting or locating actors in accordance with implementations of the present disclosure.

FIGS. 8A through 8G are views of aspects of one system for detecting or locating actors in accordance with implementations of the present disclosure.

DETAILED DESCRIPTION

Figure 1A:
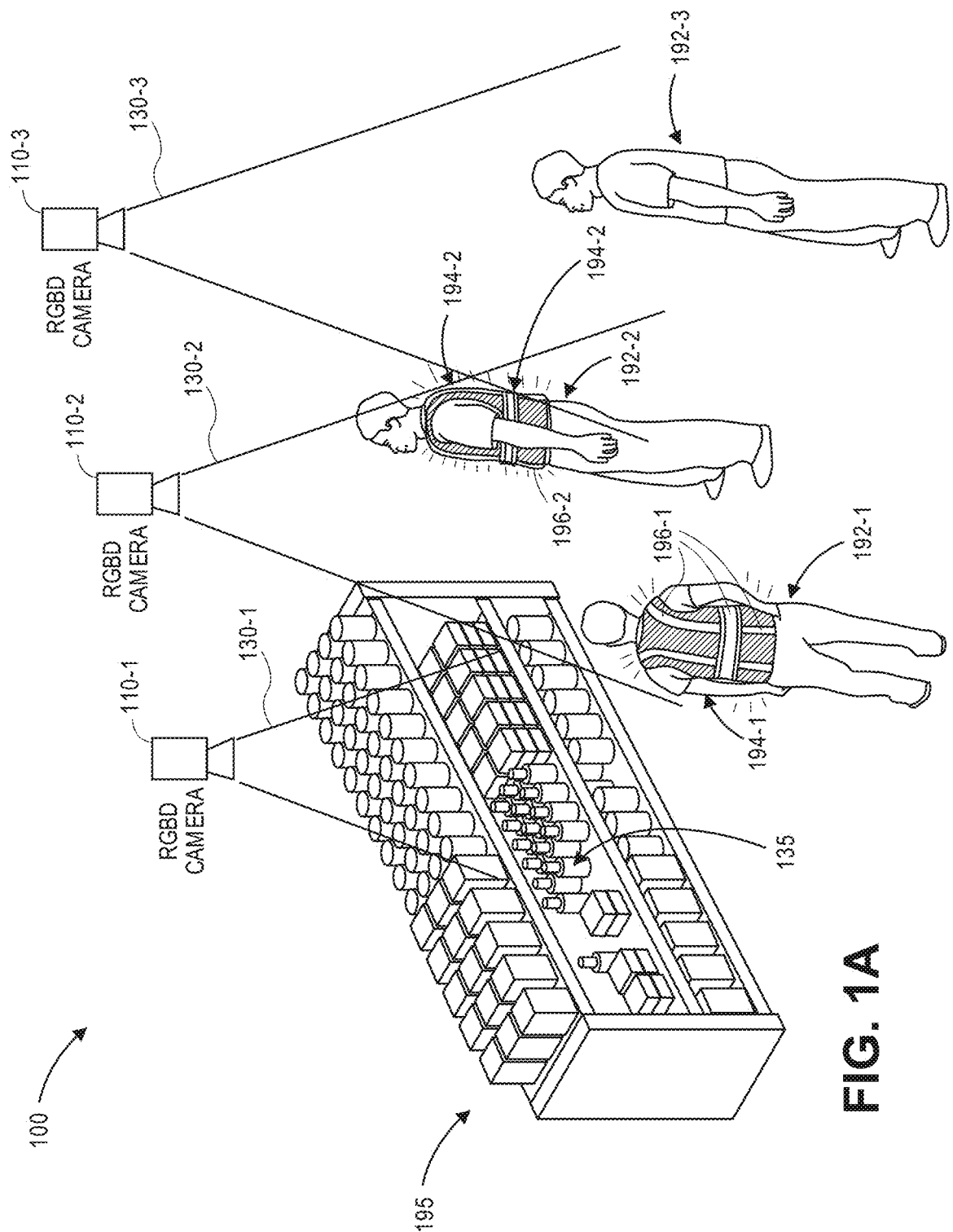

As is set forth in greater detail below, the present disclosure is directed to detecting or locating actors in scenes based on depth imaging data that is subject to varying degrees of degradation, such as saturation due to the presence of one or more retroreflective objects or surfaces on the scene, or for any other reason. More specifically, the systems and methods disclosed herein are directed to capturing depth imaging data from a scene (e.g., at a materials handling facility) using time-of-flight cameras, and determining whether the depth imaging data is of sufficiently high quality to generate or update a model of the scene, such as a location map that includes positions of one or more actors thereon, or to detect or locate one or more actors on the scene. Whether depth imaging data is of sufficiently high quality may be determined based on a ratio of saturated or otherwise degraded pixels within a frame of the depth imaging data to a total number of relevant pixels within the frame of the depth imaging data. If a depth image is determined to be of sufficient quality, the depth image may be processed to detect one or more actors or other objects thereon, and a location map of positions of the actors or the other objects may be determined based on the depth image.

If a depth image is determined to be of insufficient quality, however, a location map of positions of actors or other objects on the scene may be generated or updated based on one or more visual images. For example, where ratios of degraded pixels in depth images are determined to exceed a predetermined threshold, one or more visual images captured simultaneously or substantially simultaneously with the depth image may be provided as inputs to a machine learning system that operates on digital cameras that captured the visual image or on one or more other computer devices. Outputs received from the machine learning system may be processed to not only detect one or more body parts (e.g., heads) depicted therein but also to predict distances (or depths or ranges) to such body parts. A model of a scene may be updated based on depth images captured by one or more of the respective digital cameras or, alternatively, based on the detections and the distances predicted based on visual images captured by one or more of the respective digital cameras, in lieu of depth images of sufficient quality. Where an imaging device generates or updates a model of the scene based on depth images or visual images, such models may be combined into a composite location map that is representative of positions of actors or other objects on the scene. Moreover, where an actor has been located on a scene, and the actor is determined to be a source of saturation or other degradation of pixels within frames of depth imaging data, the actor may be tracked over time by searching for or identifying overlapping fields of view of time-of-flight cameras or other depth cameras having high ratios of saturated or otherwise degraded pixels.

Figure 1B:
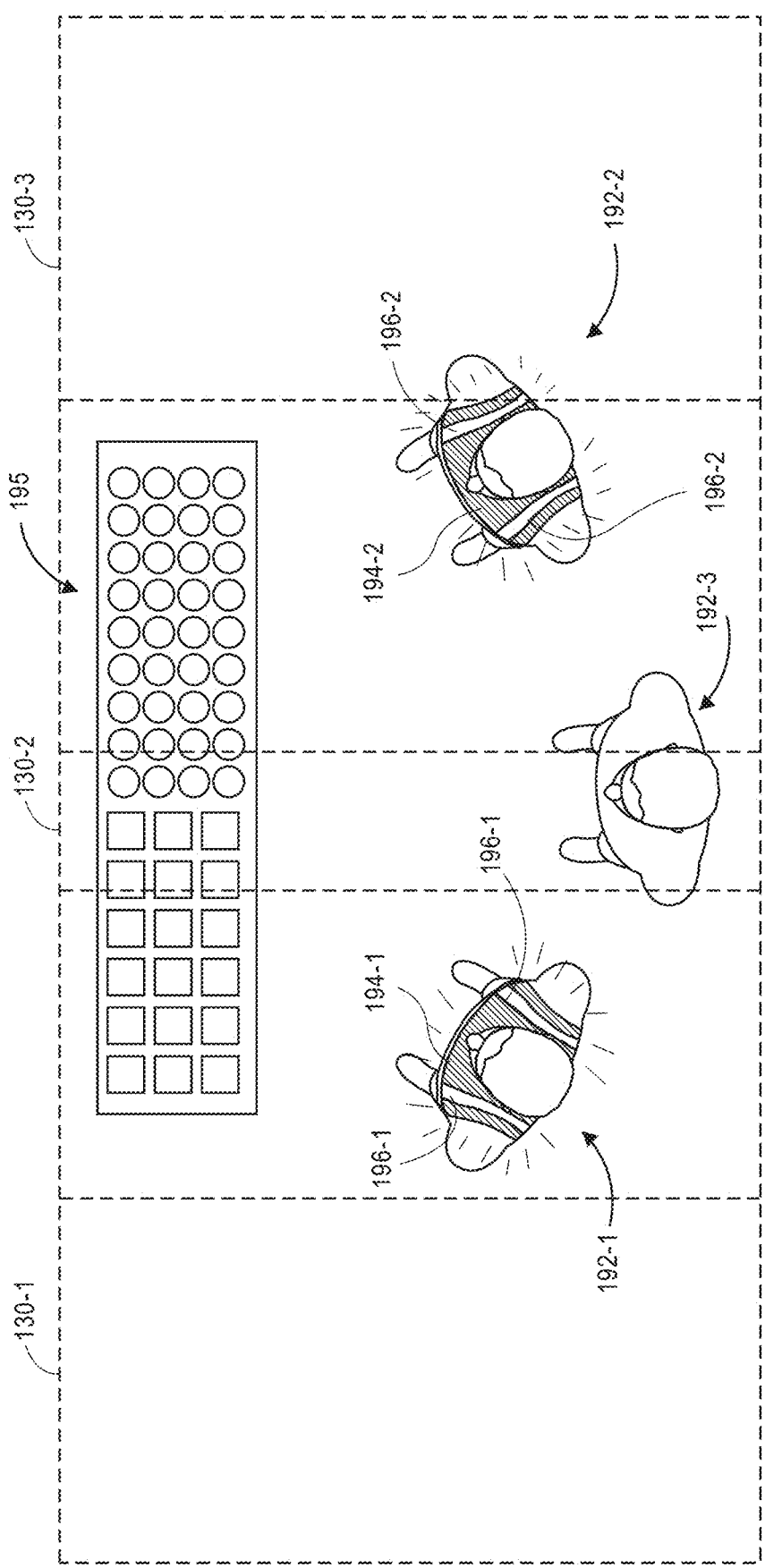
Figure 1C:
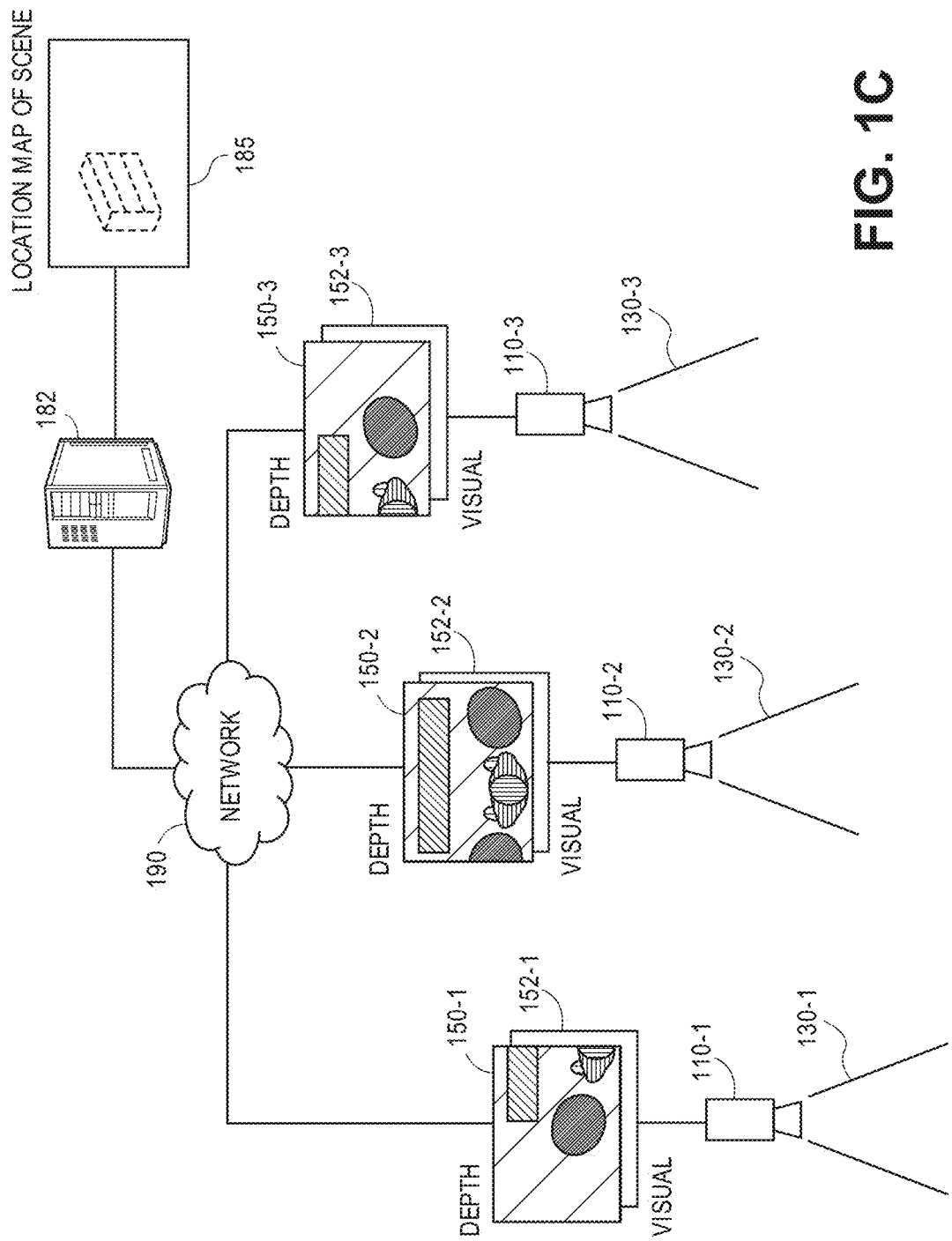

Referring to FIGS. 1A through 1I, views of aspects of one system for detecting or locating actors in accordance with the present disclosure are shown. As is shown in FIGS. 1A through 1C, a plurality of imaging devices 110-1, 110-2, 110-3 and a server 182 are connected to one another over a network 190, which may include the Internet in whole or in part. The imaging devices 110-1, 110-2, 110-3 are "RGBD cameras," or other imaging devices that are outfitted with both depth sensors, e.g., time-of-flight sensors, and visual sensors. The imaging devices 110-1, 110-2, 110-3 have fields of view 130-1, 130-2, 130-3 that include at least a portion of a materials handling facility, e.g., an inventory storage unit 195 (e.g., at least one of a shelf, a table, a bin, a rack, a bar or a hook) with a plurality of items stored thereon. The imaging devices 110-1, 110-2, 110-3 include illuminators for illuminating the field of view with modulated light pulses, and sensors for capturing and interpreting light reflected from the storage unit 195, light reflected from the items on the storage unit 195, and/or light reflected from one or more actors 192-1, 192-2, 192-3. In some implementations, the sensors of the imaging devices 110-1, 110-2, 110-3 may include a plurality of photoreceptors or other pixel sensors, and such photoreceptors or pixel sensors may be arranged in an array, a grid or any other shape or arrangement. Additionally, the imaging devices 110-1, 110-2, 110-3 may be calibrated, such that mappings between coordinates of imaging data captured by such cameras and directions relative to their respective image sensors are known.

As is shown in FIGS. 1A and 1B, the actors 192-1, 192-2 are each wearing retroreflective vests (or other retroreflective clothing) 194-1, 194-2 having one or more strips, bands, sections or other portions of retroreflective material 196-1, 196-2. As is also shown in FIGS. 1A and 1B, the actor 192-3 is not wearing any retroreflective clothing, however.

Where retroreflective materials are present within fields of view of time-of-flight cameras, pixel sensors that detect light reflected from such materials are often saturated, and the effects of such saturation may impact pixels corresponding to the retroreflective materials and also neighboring or surrounding pixels within raw sensor data or depth images generated therefrom, e.g., by obscuring distances to the retroreflective materials.

As is shown in FIG. 1C, the imaging devices 110-1, 110-2, 110-3 capture depth images 150-1, 150-2, 150-3 and visual images 152-1, 152-2, 152-3 based on light reflected from surfaces within their fields of view 130-1, 130-2, 130-3. In some implementations of the present disclosure, each of the imaging devices 110-1, 110-2, 110-3 may process the depth images 150-1, 150-2, 150-3 and visual images 152-1, 152-2, 152-3 respectively captured thereby, e.g., according to one or more machine learning tools or techniques. For example, one or more processors of each of the imaging devices 110-1, 110-2, 110-3 may be programmed or configured to execute one or more machine learning tools or techniques to detect one or more body parts or other aspects of human actors or other objects, or to segment portions of imaging data that include human actors or other objects. In some implementations, such processors may receive one or more of the depth images 150-1, 150-2, 150-3 or one or more of the visual images 152-1, 152-2, 152-3 as inputs to such machine learning tools or techniques, and one or more body parts of an actor, e.g., one or more of the actors 192-1, 192-2, 192-3, or distances to such actors 192-1, 192-2, 192-3, may be determined or predicted based on outputs received from the one or more machine learning tools or techniques.

The server 182 may be configured to generate one or more location maps 185 or one or more other representations of the scene, including but not limited to positions or orientations of one or more aspects of the actors 192-1, 192-2, 192-3 or the storage unit 195, based on information or data generated or received from the respective imaging devices 110-1, 110-2, 110-3. The location maps 185 may be point clouds or other three-dimensional representations of features on the scene, e.g., the storage unit 195, including coordinates of points on surfaces of the storage unit 195, or any other objects that may be present on the scene, including but not limited to the actors 192-1, 192-2, 192-3. For example, in some implementations, a location map 185 of a scene may be generated based on a background model that initially describes the scene, including positions and/or dimensions of background features thereon, such as the storage unit 195, and may be subsequently updated to reflect changes in the composition of the scene. A background model may be generated in any manner, such as based on depth images captured using one or more of the imaging devices 110-1, 110-2, 110-3, or in any other manner, where such depth images are not subject to excessive saturation or otherwise degraded. Alternatively, each of the depth images 150-1, 150-2, 150-3 and visual images 152-1, 152-2, 152-3 may be provided to the server 182 over the network 190, and the server 182 may process such images 150-1, 150-2, 150-3, 152-1, 152-2, 152-3, e.g., according to one or machine learning tools or techniques operating on the server 182, to generate the location maps 185 of the scene based on the images 150-1, 150-2, 150-3, 152-1, 152-2, 152-3.

The depth images 150-1, 150-2, 150-3 are generated from raw sensor data captured by the respective imaging devices 110-1, 110-2, 110-3. In some implementations, the depth images 150-1, 150-2, 150-3, which may be images or maps representing distances (or depths or ranges) to objects from the sensor of the imaging devices 110-1, 110-2, 110-3, are generated based on the capture of light reflected from the scene as a result of the illumination at selected energies or powers. As is shown in FIG. 1D, the depth image 150-1 shows a region 155-1 corresponding to the actor 192-1 that is corrupted by supersaturation due to reflections from the retroreflective vest 194-1, as shown in FIGS. 1A and 1B, as well as a region 155-3 corresponding to distances to the actor 192-3 and a region 155-4 corresponding to distances to the storage unit 195 that are not so corrupted. The reflection of light from the retroreflective materials 196-1 worn by the actor 192-1 and the resulting saturation of pixel sensors cause the region 155-1 to have distortions or corruptions that encompass substantial portions of the depth image 150-1 which are larger than the size of the retroreflective vest 194-1 within the plane of the depth image 150-1. The reflection of light from aspects of the actor 192-3 or the storage unit 195 are not so corrupted. A ratio of the number of degraded (e.g., supersaturated) pixels within the depth image 150-1, e.g., within the region 155-1, to the total number of pixels in the depth image 150-1 may be calculated by one or more processors aboard the imaging device 110-1 or, alternatively, the server 182. For example, where the depth image 150-1 has dimensions of four thousand pixels by three thousand pixels, and the number of degraded (e.g., supersaturated) pixels in the region 155-1 shown in FIG. 1D is 381,244, the ratio of degradation (e.g., supersaturation) within the depth image 150-1 is approximately 3.18 percent.

Similarly, as is shown in FIG. 1E, the depth image 150-2 shows the region 155-1 corresponding to the actor 192-1, as corrupted by supersaturation due to reflections from the retroreflective vest 194-1, along with another region 155-2 that is also corrupted by supersaturation due to reflections from the retroreflective vest 194-2 of the actor 192-2, as well as the regions 155-3, 155-4, which correspond to distances (or depths or ranges) to the actor 193-3 and the storage unit 195, and are not so corrupted. Where the depth image 150-2 has dimensions of four thousand pixels by three thousand pixels, and the number of degraded pixels in the depth image 150-2 (viz., the regions 155-1, 155-2) shown in FIG. 1E is 526,424, the ratio of degradation within the depth image 150-2 is approximately 4.38 percent.

Figure 1F:
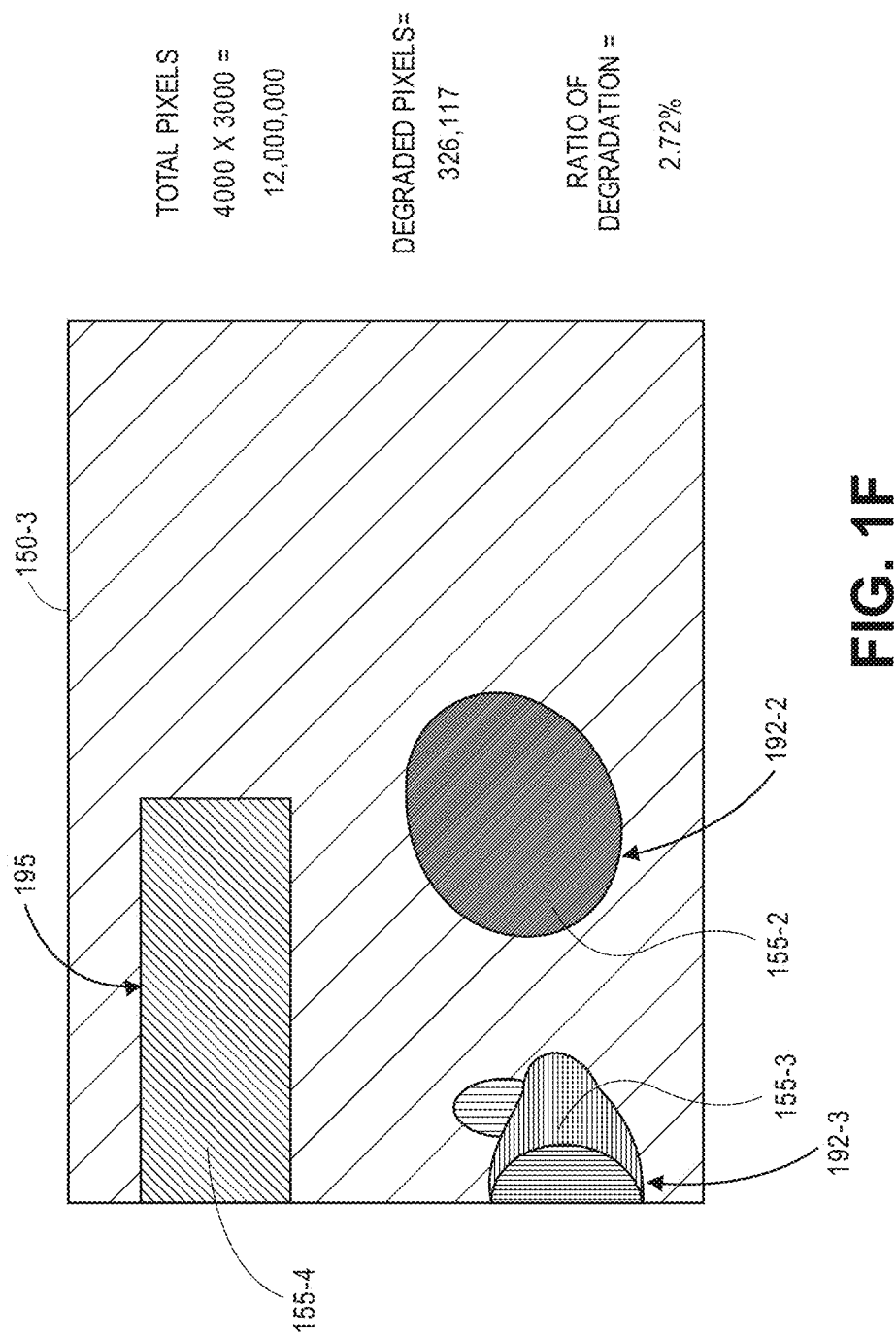

Likewise, as is shown in FIG. 1F, the depth image 150-3 also shows the region 155-2 as corrupted by supersaturation due to reflections from the retroreflective vest 194-2, along with the region 155-3 and the region 155-4 corresponding to distances to the actor 192-3 and the storage unit 195, which are not so corrupted. Where the depth image 150-3 has dimensions of four thousand pixels by three thousand pixels, and the number of supersaturated pixels in the depth image 150-3 (viz., the region 155-3) shown in FIG. 1F is 326,117, the ratio of supersaturation within the depth image 150-3 is approximately 2.72 percent.

The extent to which pixel sensors of the imaging devices 110-1, 110-2, 110-3 are saturated or otherwise degraded by reflections from the retroreflective vests 194-1, 194-2 or any other retroreflective materials on the scene may depend on any factors. In some implementations, a size of a corrupted region, or a number of saturated pixel sensors, may depend on a visible contrast between a retroreflective material and neighboring portions of the scene, e.g., between the retroreflective vests 194-1, 194-2 and the retroreflective materials 196-1, 196-2, or a relative difference in signals generated by the corresponding pixel sensors. For example, where a retroreflective material is applied against a bright background, e.g., a yellow or orange background, a relative difference in signals generated by the pixel sensors at or near an interface between the retroreflective material and the background may be comparatively low, and a corrupted region associated with the retroreflective materials will likewise be substantially small. Where a retroreflective material is applied against a dark background, however, e.g., a black or a brown background, a relative difference in signals generated by the pixel sensors at or near an interface between the retroreflective material and the background may be comparatively high, and a corrupted region associated with the retroreflective materials may be substantially large.

The regions 155-1, 155-2 may be identified as corrupted within the depth images 150-1, 150-2, 150-3, or within the raw sensor data from which the depth images 150-1, 150-2, 150-3 were generated, on any basis. For example, where a clipping value (e.g., a distortion limit), e.g., 0 or 4095 for a twelve-bit pixel sensor, is reached for a predetermined threshold number of pixel sensors (e.g., for ten, one hundred, one thousand, or another number of the pixel sensors) for a given set of raw sensor data, the raw sensor data may be determined to be distorted or corrupted at locations corresponding to the saturated pixel sensors, and the imaging devices 110-1, 110-2, 110-3 may be presumed to have one or more retroreflective materials within the field of view. Where the depth images 150-1, 150-2, 150-3 are generated from a predetermined number of sets of raw sensor data (e.g., eight) captured at various frequencies or phase differences between the illumination pulsing and the pixel exposure, the imaging devices 110-1, 110-2, 110-3 may be presumed to have one or more retroreflective materials within the fields of view 130-1, 130-2, 130-3 when a threshold number of the sets of raw sensor data (e.g., six or seven) captured by the respective imaging devices 110-1, 110-2, 110-3 are identified as having the predetermined threshold number of pixel sensors at or above the clipping value.

In accordance with some implementations of the present disclosure, where ratios of degradation (e.g., supersaturation) within one or more of the depth images 150-1, 150-2, 150-3 exceed predetermined thresholds, e.g., one-tenth of one percent, one-half of one percent, one percent, or another threshold, the depth images 150-1, 150-2, 150-3 may not be used to generate or update the location map 185. Instead, the location map 185 depicting positions of one or more aspects of the actors 192-1, 192-2, 192-3 or the shelving unit 195 may be generated or updated based on detected objects such as one or more body parts of the actors 192-1, 192-2, 192-3 or the shelving unit 195 within visual images captured substantially simultaneously with the depth images 150-1, 150-2, 150-3, and predicted distances (or depths or ranges) to such objects. In some implementations, the actors 192-1, 192-2, 192-3 and the shelving unit 195 are detected based on outputs from one or more machine learning tools or techniques.

Figure 1G:
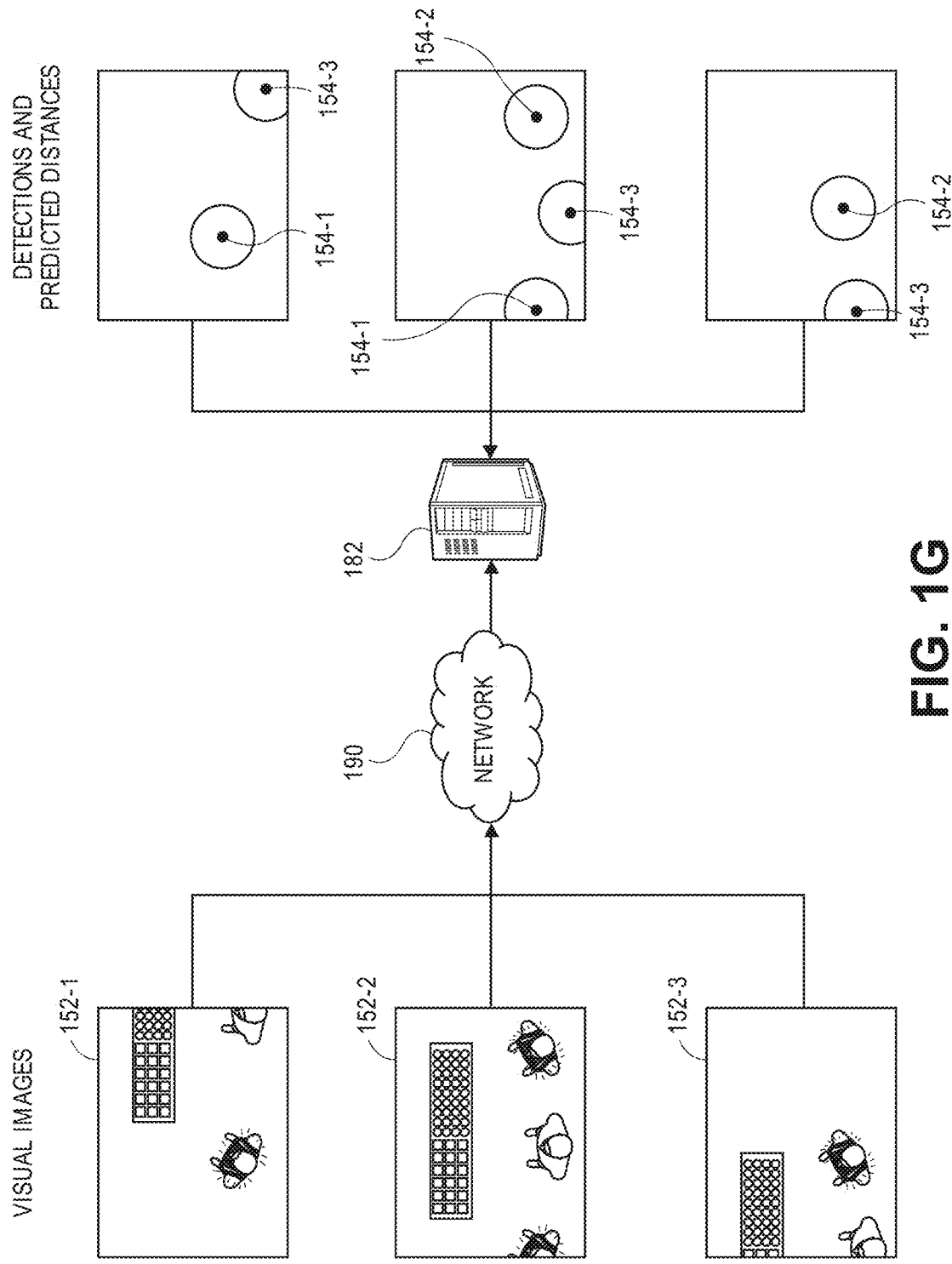

For example, as is shown in FIG. 1G, the visual images 152-1, 152-2, 152-3 are provided to the server 182 over the network 190, and positions of the one or more body parts 154-1, 154-2, 154-3 of the actors 192-1, 192-2, 192-3, as well as predicted distances to such body parts 154-1, 154-2, 154-3, are generated by the server 182. For example, the visual images 152-1, 152-2, 152-3 may be provided to one or more machine learning tools or techniques operating on the server 182, e.g., artificial neural networks, which may be trained to detect one or more body parts within visual imaging data, or to predict distances to such body parts, to varying degrees of confidence. Similarly, positions of one or more aspects of the shelving unit 195 or any other objects on the scene and within fields of view of one or more of the imaging devices 110-1, 110-2, 110-3 may also be generated by the server 182 based on outputs received from one or more machine learning tools or techniques, such as where the machine learning tools or techniques are trained to detect such objects, e.g., the shelving unit 195, within imaging data or to predict distances (or depths or ranges) to aspects of such objects. Alternatively, the positions of the body parts 154-1, 154-2, 154-3 and the predicted distances to such body parts 154-1, 154-2, 154-3 may be generated by each of the imaging devices 110-1, 110-2, 110-3 based on the visual images 152-1, 152-2, 152-3 captured thereby, rather than by the server 182. For example, the positions and the predicted distances may be generated based on outputs received from machine learning tools or techniques operated by processors on each of the imaging devices 110-1, 110-2, 110-3. Once generated by each of the imaging devices 110-1, 110-2, 110-3, the positions and the predicted distances may be provided to the server 182 over the network 190. Similarly, positions of aspects of the shelving unit a195 and predicted distances to such aspects may also be generated by each of the imaging devices 110-1, 110-2, 110-3 based on the visual images 152-1, 152-2, 152-3 captured thereby, and provided to the server 182 over the network 190.

As is shown in FIG. 1H, where the actors 192-1, 192-2, 192-3 appear within fields of view of two or more of the imaging devices 110-1, 110-2, 110-3, the server 182 may further refine positions of the actors 192-1, 192-2, 192-3 by triangulating lines (e.g., rays) extending from visual sensors of the respective imaging devices 110-1, 110-2, 110-3 through the respective body parts 154-1, 154-2, 154-3 within the image planes of the visual images 152-1, 152-2, 152-3. Where such lines extending through the common body parts 154-1, 154-2, 154-3 intersect, positions $P_1(x, y, z)$, $P_2(x, y, z)$, $P_3(x, y, z)$ in three-dimensional space of the body parts that the imaging devices 110-1, 110-2, 110-3 and/or the server 182 was configured to recognize within visual imaging data are determined. Alternatively, the positions $P_1(x, y, z)$, $P_2(x, y, z)$, $P_3(x, y, z)$ may be determined for each of a plurality of points on surfaces of the actors 192-1, 192-2, 192-3 that appear in common within two or more of the visual images 152-1, 152-2, 152-3, e.g., by stereo triangulation. Similarly, positions to one or more aspects of the shelving unit 195 may also be determined by triangulating rays extending from the visual sensors of the respective imaging devices 110-1, 110-2, 110-3 through pixels corresponding to such aspects. Alternatively, where an object (e.g., one or more of the actors 192-1, 192-2, 192-3 or one or more aspects of the shelving unit 195) appears within imaging data captured using a single imaging device, positions of the object and predicted distances (or depths or ranges) to the object, e.g., as determined based on outputs received from one or more machine learning systems, may be utilized without triangulation.

Figure 1I:
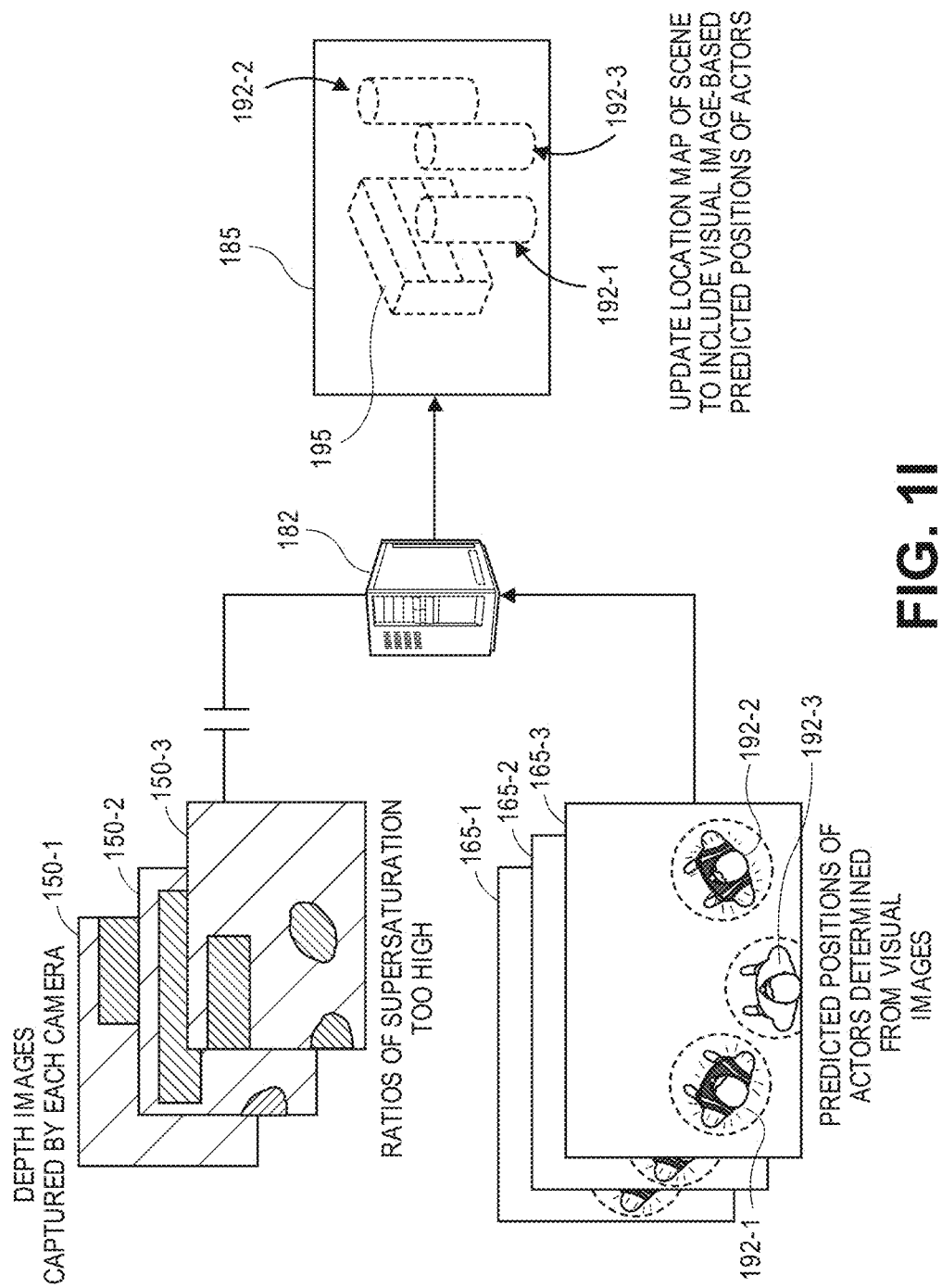

Therefore, in accordance with the present disclosure, the server 182 may be configured to generate or update the model 185 of a scene to include positions of one or more actors or other objects on the scene, e.g., one or more of the actors 192-1, 192-2, 192-3 or the shelving unit 195, based on a plurality of depth images 150-1, 150-2, 150-3 where proportions of the depth images 150-1, 150-2, 150-3 that are supersaturated or otherwise degraded are sufficiently low, e.g., where ratios of degraded pixels to total pixels are below a predetermined threshold. Alternatively, however, where ratios of degraded pixels to total pixels are above the predetermined threshold, such as is shown in FIG. 1I, the location map 185 may be generated based on positions in three-dimensional space of the body parts detected within the visual images 152-1, 152-2, 152-3 and predicted distances to such body parts as determined from the visual images 152-1, 152-2, 152-3 may be used to generate or update the location map 185, e.g., to include the actors 192-1, 192-2, 192-3 and/or the storage unit 195 therein.

Additionally, in some implementations, where levels of excessive supersaturation or other forms of degradation are recognized within coverage areas defined in imaging data captured by one or more imaging devices including time-of-flight cameras, numbers of coverage areas of imaging devices may be determined, and a detection of an actor that has been "lost" due to supersaturation or other degradation may be maintained for a predetermined period of time or for a predetermined number of frames in order to accommodate for the effects of the supersaturation or degradation, which may be temporary in nature.

Accordingly, the systems and methods of the present disclosure may be used to generate or update models of scenes, or to detect or locate actors that are present on such scenes, even where one or more retroreflective objects are located within fields of view of time-of-flight cameras, or where depth imaging data captured by such cameras is degraded for any other reason. Retroreflective material may be detected within raw sensor data obtained by a time-of-flight camera that illuminates a scene in a plurality of phases and captures light that is reflected from the scene, where a predetermined number of photoreceptors or other pixel sensors are exceedingly saturated (e.g., supersaturated) by the reflected light. Where retroreflective material covering an object is present within a field of view of an imaging device that includes a time-of-flight sensor, the presence of the retroreflective material within the field of view creates additional pixels of noise or other adverse effects around the object while also obscuring depth pixels corresponding to the object or causing such depth pixels to disappear or otherwise be degraded. The systems and methods of the present disclosure may be used to generate or update models of scenes, or detect and locate actors or other objects that are present on such scenes, despite such adverse effects, by processing visual images captured simultaneously or substantially simultaneously by such imaging devices to detect one or more objects (e.g., body parts of an actor) and to predict distances (or depths or ranges to such objects) accordingly, and updating a map of locations of objects based on the visual images, rather than the depth images that are plagued by saturation or other forms of degradation.

A time-of-flight camera is an imaging device having an illuminator and a sensor that determines distances to each of a plurality of pixels corresponding to a portion of a scene within a field of view by illuminating the scene using the illuminator, e.g., a modulated light source, and capturing light reflected from the scene by the sensor. The illuminator typically emits light (e.g., infrared or near-infrared light having a wavelength between eight hundred and nine hundred nanometers, or 800-900 nm) by way of a laser, a light-emitting diode (or "LED"), or another light source. The sensor may be an array of photodetectors, photosensitive components or other pixel sensors such as a charge coupled device ("CCD"), a complementary metal-oxide sensor ("CMOS"), photodiodes, or the like. The sensor may capture light reflected from objects on the scene, and assign one or more quantitative values (e.g., distances or ranges to such objects) to aspects of the reflected light. In some implementations, a time-of-flight camera may be a discrete, standalone unit. In some other implementations, a time-of-flight camera may be integrally or functionally joined with a visual camera, e.g., a color camera, a grayscale camera or a black-and-white camera.

In some implementations, a time-of-flight camera operates by illuminating a scene and determining a time required for light to travel from the illuminator to an individual photodetector of the sensor. A distance from the time-of-flight camera to each of the respective portions of a scene corresponding to one of the photodetectors may be determined as a function of the speed of light, or approximately 300 million meters per second (or $3.0 \times 10^8$ m/s). Because a time-of-flight camera may illuminate an entire field of view simultaneously, a time-of-flight camera may be used to generate depth images or profiles of the field of view quickly and efficiently from each illumination.

A time-of-flight camera may operate to illuminate a scene, or to capture light reflected from the scene, in any number of ways. For example, in some implementations, an illuminator of a time-of-flight camera may operate using one or more pulsed light sources. Pulsed modulation may be achieved by integrating photoelectrons from reflected light, or by counting light contact at a first detection of a reflection, e.g., by a single photon avalanche diode, or another type of sensor having any number of photoreceptors (or other pixel sensors) thereon. Electrical charges may be accumulated and measured by each of the photoreceptors, for each of the pulses, during windows that are in-phase and/or out-of-phase with the illumination. The measured electrical charges may be used to calculate distances to portions of the scene appearing within the field of view that correspond to such photoreceptors accordingly. Where the electrical charge accumulated by a photoreceptor exceeds a predetermined threshold, the photoreceptor is determined to be saturated, and a corresponding pixel (e.g., a voxel) of a depth image generated based on the electrical charge will be distorted or corrupted. A number of the photoreceptors that are determined to be saturated to a predetermined extent may be counted based on the imaging data, e.g., a number of pixels of the depth image that are distorted or corrupted.

In some implementations, an illuminator of a time-of-flight camera may operate using a continuous wave light source which captures a number of samples at different phases with respect to the illumination. For example, a continuous wave time-of-flight camera may capture four samples, e.g., at four phases, each phase-stepped by ninety degrees (viz., zero, ninety, one hundred eighty or two hundred seventy degrees). In some implementations, a phase-shift of a signal, a signal strength and/or an offset (or a gray-scale value) may be calculated for each of the photoreceptors of a sensor, or pixels of a depth image, as a function of the electrical charge accumulated in each of the samples. A distance associated with each of the photoreceptors of the sensor, or pixels of the depth image (e.g., voxels) may be calculated as a function of the speed of light, the phase-shift and a modulation frequency, which may be selected based on the distances or ranges to be measured, a desired level of accuracy, or any other basis.

In some implementations, raw values associated with each of the photoreceptors of a sensor of the time-of-flight camera may be determined, and whether such photoreceptors are saturated may be determined by comparing values of pixels (e.g., voxels) of a depth image generated thereby to a selected threshold. For example, in some implementations, where photoreceptors of a time-of-flight camera are twelve-bit sensors, a given photoreceptor may be determined to be saturated where a raw value exceeds 3500, or another threshold, between clipping values of 0 to 4095, for any of the phases at which the time-of-flight camera captures samples. In some implementations, the photoreceptor may be determined to be supersaturated where the raw value exceeds a higher threshold, e.g., 4000, or equals a clipping value (e.g., 0 or 4095), for each of the phases. A number of the photoreceptors that are determined to be saturated to a predetermined extent may be counted. Values may be expressed in an absolute sense, e.g., within a range of 0 to 4095 for a twelve-bit sensor, or as ratios or fractions of clipping values, e.g., within a range of 0 to 1.

Continuous waves may be illuminated at different modulation frequencies, thereby increasing a level of accuracy of depth images captured by the time-of-flight camera, or distances embodied in such depth images, accordingly. In some implementations, a continuous wave time-of-flight camera may operate at a pair of modulation frequencies, and may capture four sets of sensor data at each of the modulation frequencies, for a total of eight sets of sensor data. Each of the sets of sensor data may be evaluated to determine a number of the photoreceptors that is saturated to a predetermined extent.

Reflected light may be captured or detected by an imaging device (e.g., a time-of-flight camera) if the reflected light is within the imaging device's field of view, which is defined as a function of a distance between a sensor and a lens within the imaging device, viz., a focal length, as well as a location of the imaging device and an angular orientation of the imaging device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, an imaging device may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle) of the imaging device, by causing a change in a distance between the sensor and the lens (e.g., optical zoom lenses or digital zoom lenses), a change in a location of the imaging device, or a change in one or more of the angles defining an angular orientation.

For example, an imaging device may be hard-mounted to a support or mounting that maintains the imaging device in a fixed configuration or angle with respect to one, two or three axes. Alternatively, however, an imaging device may be provided with one or more motors and/or controllers for manually or automatically operating one or more of the components, or for reorienting the axis or direction of the imaging device, i.e., by panning or tilting the imaging device. Panning an imaging device may cause a rotation within a horizontal plane or about a vertical axis (e.g., a yaw), while tilting a imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the imaging device.

The systems and methods of the present disclosure may be utilized in any number of applications in which depth imaging operations are desired, including but not limited to applications associated with operations occurring within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect and distinguish between actors (e.g., customers) and recognize their respective interactions within a materials handling facility, where one or more actors is wearing retroreflective materials within the materials handling facility, or where one or more retroreflective objects are expected to appear within a field of view of a time-of-flight camera at the materials handling facility. Such systems and methods may also be utilized to detect and locate actors and their interactions within transportation centers, financial institutions or like structures in which diverse collections of people, objects or machines enter and exit from such environments at regular or irregular times or on predictable or unpredictable schedules, and where one or more of the people, objects or machines is wearing or covered at least in part by retroreflective materials, or where external surfaces of one or more of the people, the objects or the machines embodies retroreflective properties.

Retroreflective materials may cause photoreceptors of a time-of-flight camera sensor corresponding to such materials, and photoreceptors corresponding to nearby portions, to be saturated when sensor data is captured at selected illumination energies and for selected exposure times. Sensor data determined from photoreceptors of the time-of-flight camera sensor that are not saturated, however, may remain unaffected, and may therefore be used to construct one or more depth images therefrom.

A time-of-flight camera may be configured to illuminate a scene, and to expose a sensor, at any energies or power levels or for any selected exposure times, respectively, in accordance with the present disclosure. For example, in some implementations, one energy level (or power level) at which a time-of-flight camera may illuminate a scene may be approximately five to ten watts (5-10 W), and one exposure time may be approximately five hundred to two thousand microseconds (500-2000 μs).

Figure 2A:
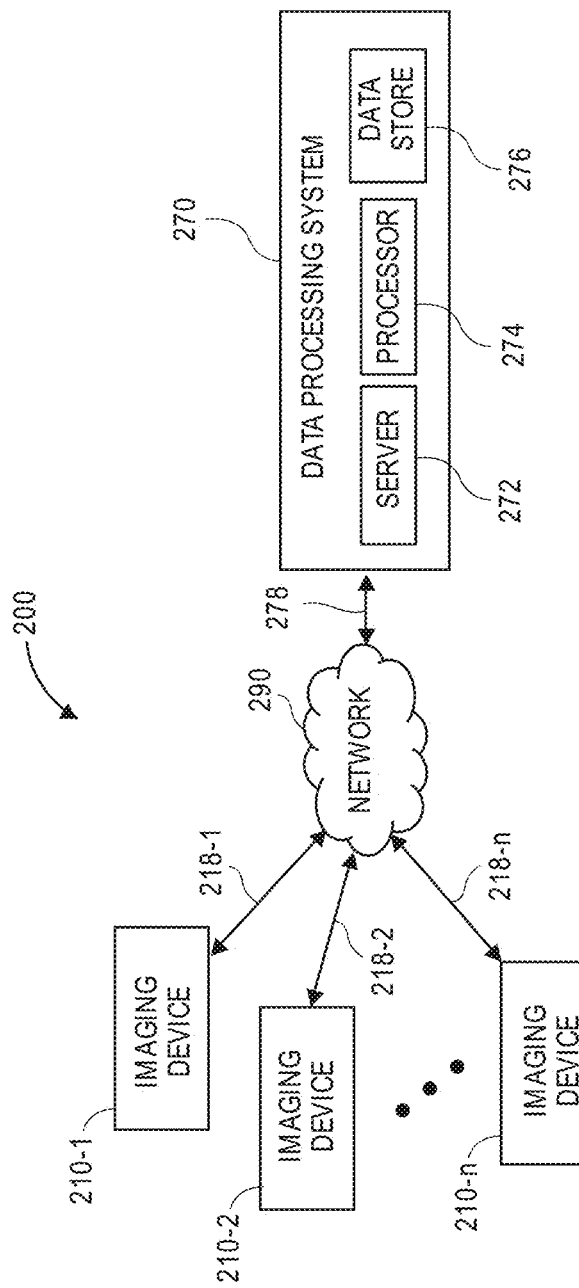
FIGS. 2A and 2B are block diagrams of one system for detecting or locating actors in accordance with implementations of the present disclosure.
Figure 2B:
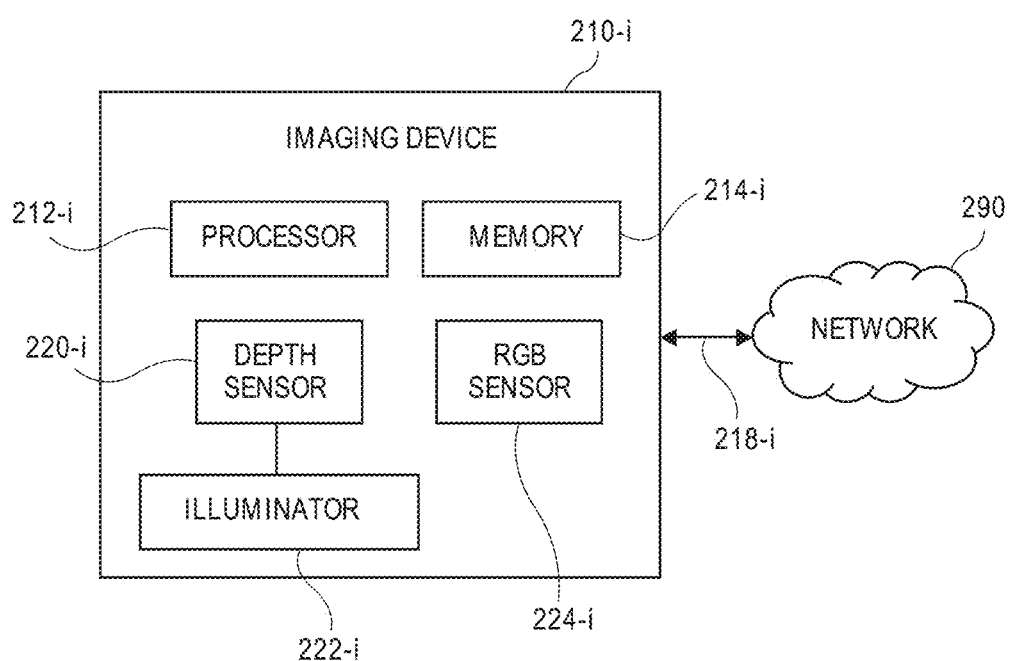

Referring to FIGS. 2A and 2B, a block diagram of one system 200 for detecting or locating actors in accordance with implementations of the present disclosure is shown. The system 200 of FIGS. 2A and 2B includes a plurality of imaging devices 210-1, 210-2 . . . 210-n and a data processing system 270 that are connected to one another over a network 290, which may include the Internet, in whole or in part. Except where otherwise noted, reference numerals preceded by the number "2" shown in FIGS. 2A and 2B indicate components or features that are similar to components or features having reference numerals preceded by the number "1" shown in FIGS. 1A through 1I.

The imaging devices 210-1, 210-2 . . . 210-n may be any form of optical recording devices that may be used to photograph or otherwise record imaging data of structures, facilities, terrain or any other elements appearing within their respective fields of view. The imaging devices 210-1, 210-2 . . . 210-n may include one or more sensors, memory or storage components and processors, and such sensors, memory components or processors may further include one or more photosensitive surfaces, filters, chips, electrodes, clocks, boards, timers, power sources, connectors or any other relevant features (not shown). Such imaging devices 210-1, 210-2 . . . 210-n may capture imaging data in the form of one or more still or moving images of any kind or form, as well as any relevant audio signals or other information. The imaging devices 210-1, 210-2 . . . 210-n may also be adapted or otherwise configured to communicate with the data processing system 270 by way of the network 290.

Each of the imaging devices 210-1, 210-2 . . . 210-n shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative imaging device 210-i includes one or more optical sensors, including one or more depth sensors 220-i, one or more illuminators 222-i and one or more RGB sensors 224-i (e.g., color sensors, or grayscale sensors, black-and-white sensors, or other visual sensors) that are configured to capture visual imaging data (e.g., textures) or depth imaging data (e.g., ranges) to objects within one or more fields of view of the imaging device 210-i.

The depth sensors 220-i and the RGB sensors 224-i may be any sensors having single elements or a plurality of photoreceptors or photosensitive components (e.g., a CCD sensor, a CMOS sensor, or another sensor), which may be typically arranged in an array. Light reflected from objects within a field of view of the imaging device 210-i may be captured by the depth sensors 220-i and the RGB sensors 224-i, and quantitative values, e.g., pixels, may be assigned to one or more aspects of the reflected light. The illuminators 222-i may be any system such as a laser system or a light-emitting diode (or "LED") for illuminating a portion of a scene appearing within a field of view of the imaging device 210-i, e.g., by infrared or near-infrared light, such as light with wavelengths ranging from approximately seven hundred to approximately one thousand nanometers (700-1000 nm), or light having any other wavelengths.

The imaging device 210-i further includes one or more processors 212-i and one or more memory components 214-i, and any other components (not shown) that may be required in order to capture, analyze and/or store imaging data. For example, the imaging device 210-i may capture one or more still or moving images (e.g., streams of visual and/or depth image frames), along with any relevant audio signals or other information (e.g., position data), and may also connect to or otherwise communicate with the server 272, or any other computer devices over the network 290, through the sending and receiving of digital data. In some implementations, the imaging device 210-i may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 272 or over the network 290 directly. The processors 212-i may be configured to process imaging data captured by one or more of the depth sensors 220-i or the RGB sensors 224-i. For example, in some implementations, the processors 212-i may be configured to execute any type or form of machine learning tools or technique, e.g., an artificial neural network.

The imaging devices 210-1, 210-2 . . . 210-n may be homogenous or heterogeneous in nature, in accordance with the present disclosure. For example, one or more of the imaging devices 210-1, 210-2 . . . 210-n may have both the depth sensor 220-i and the RGB sensor 224-i. Alternatively, one or more of the imaging devices 210-1, 210-2 . . . 210-n may have just a depth sensor 220-i or just a RGB sensor 224-i (or grayscale sensor or black-and-white sensor). For example, one or more of the imaging devices 210-1, 210-2 . . . 210-n may be an RGB color camera, a still camera, a motion capture/video camera or any other type or form of camera. In other implementations, one or more of the imaging devices 210-1, 210-2 . . . 210-n may be depth-sensing cameras, such as an RGBD or RGBz camera. In still other implementations, one or more of the imaging devices 210-1, 210-2 . . . 210-n may be a thermographic or infrared (IR) camera. Additionally, in some implementations, the imaging devices 210-1, 210-2 . . . 210-n may simply be camera modules that include a lens and an image sensor configured to convert an optical image obtained using the lens of the camera into a digital signal or digital representation of the image (generally referred to herein as imaging data).

The imaging devices 210-1, 210-2 . . . 210-n may also include manual or automatic features for modifying their respective fields of view or orientations. For example, one or more of the imaging devices 210-1, 210-2 . . . 210-n may be configured in a fixed position, or with a fixed focal length (e.g., fixed-focus lenses) or angular orientation. Alternatively, one or more of the imaging devices 210-1, 210-2 . . . 210-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 210-1, 210-2 . . . 210-*n*, or changes in one or more of the angles defining the angular orientation.

For example, one or more of the imaging devices 210-1, 210-2 . . . 210-*n* may be hard-mounted to a support or mounting that maintains the device in a fixed configuration or angle with respect to one, two or three axes. Alternatively, however, one or more of the imaging devices 210-1, 210-2 . . . 210-*n* may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 210-1, 210-2 . . . 210-*n* may digitally or electronically adjust an image captured from a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

Although the system 200 of FIG. 2A includes boxes corresponding to three imaging devices 210-1, 210-2 . . . 210-*n*, those of ordinary skill in the pertinent arts will recognize that any number or type of imaging devices may be operated in accordance with the present disclosure, including but not limited to digital cameras, depth sensors or range cameras, infrared cameras, radiographic cameras or other devices having one or more optical sensors. In some implementations, the system 200 may include dozens or even hundreds of imaging devices of any type or form.

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2A may be independently provided for the exclusive purpose of receiving, analyzing or storing imaging data or other information or data received from the imaging devices 210-1, 210-2 . . . 210-*n* or, alternatively, provided in connection with one or more physical or virtual services that are configured to receive, analyze or store such imaging data or other information or data, as well as one or more other functions. In some implementations, the data processing system 270 may be associated with a materials handling facility, or any other physical or virtual facility.

The servers 272 may be connected to or otherwise communicate with the processors 274 and the data stores 276, which may store any type of information or data, including but not limited to acoustic signals, information or data relating to imaging data, or information or data regarding environmental conditions, operational characteristics, or positions, for any purpose. The servers 272, the computer processors 274 and/or the data stores 276 may also connect to or otherwise communicate with the network 290, as indicated by line 278, through the sending and receiving of digital data. For example, the data processing system 270 may include any facilities, stations or locations having the ability or capacity to receive and store information or data, such as media files, in one or more data stores, e.g., media files received from the imaging devices 210-1, 210-2 . . . 210-*n*, or from one or more other external computer systems (not shown) via the network 290. In some implementations, the data processing system 270 may be provided in a physical location. In other such implementations, the data processing system 270 may be provided in one or more alternate or virtual locations, e.g., in a "cloud"-based environment. In still other implementations, the data processing system 270 may be provided onboard one or more vehicles, e.g., an unmanned aerial vehicle.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The imaging devices 210-1, 210-2 . . . 210-*n* and/or the data processing system 270 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the imaging devices 210-1, 210-2 . . . 210-*n* may be adapted to transmit information or data in the form of synchronous or asynchronous messages to the data processing system 270 or to any other computer device in real time or in near-real time, or in one or more offline processes, via the network 290. Those of ordinary skill in the pertinent art would recognize that the imaging devices 210-1, 210-2 . . . 210-*n* or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 212-*i* or the processor 274, or any other computers or control systems utilized by the imaging devices 210-1, 210-2 . . . 210-*n* or the data processing system 270, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
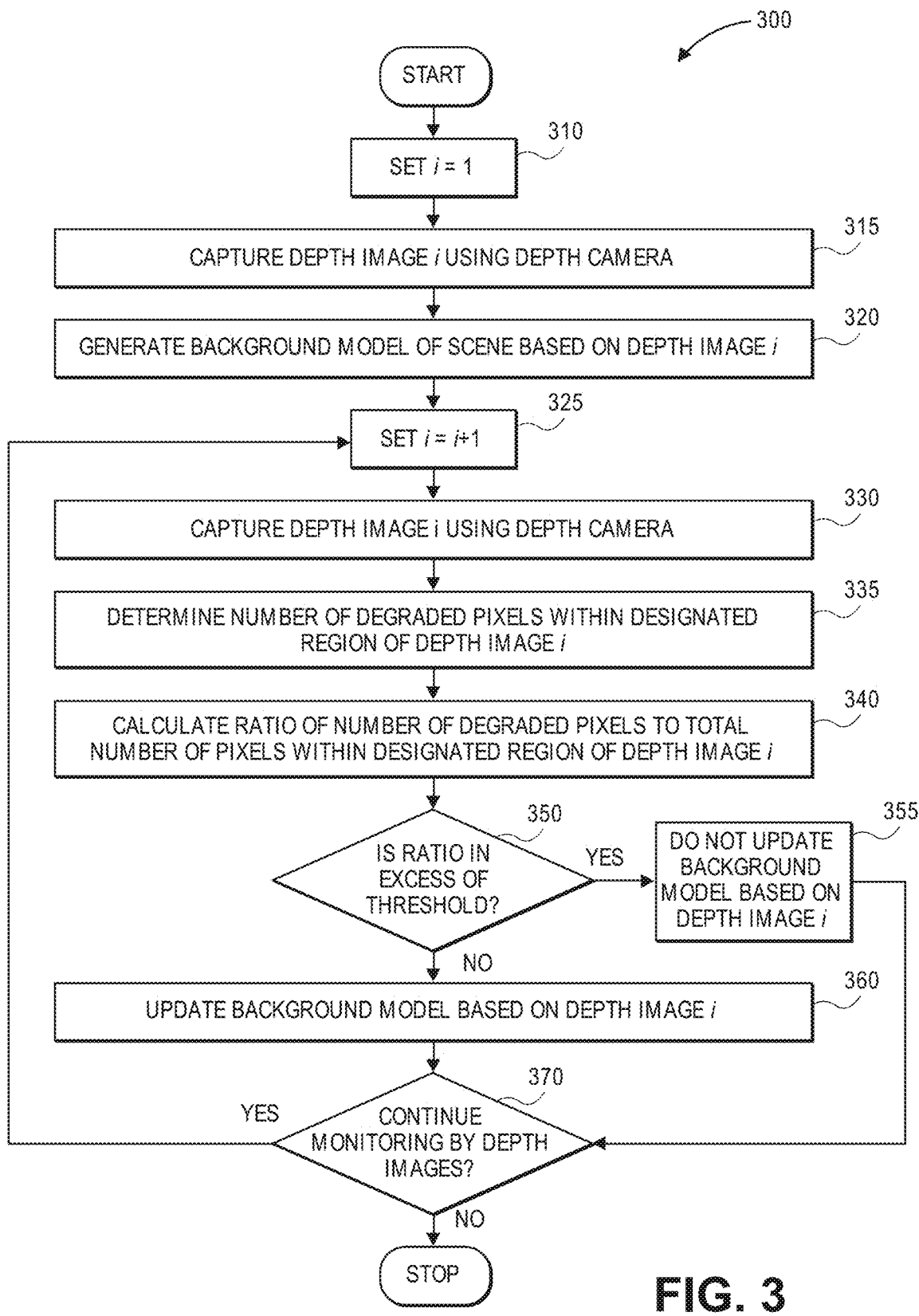
FIG. 3 is a flow chart of one process for detecting or locating actors in accordance with implementations of the present disclosure.

In some implementations, the systems and methods of the present disclosure may be configured to generate a background model of a scene, or update the background model, based on depth imaging data that is not saturated or otherwise degraded. Where the depth imaging data is saturated or otherwise degraded, however, the background model may not be updated based on the depth imaging data. Referring to FIG. 3, a flow chart 300 of one process for detecting or locating actors in accordance with implementations of the present disclosure is shown. At box 310, a value of a step variable i is set to one, or i=1. At box 315, a depth image i is captured using a depth camera. The depth camera may be one of a plurality of depth cameras aligned with fields of view that are aligned with vertically downward or substantially downward orientations, toward floors or traveling surfaces on a scene, and overlap with one another. In some implementations, the depth camera may be a part of a camera having both depth sensors and visual sensors, e.g., an RGBD camera, and the depth image i may be captured along with one or more other visual images, such as black-and-white, grayscale or color visual images.

At box 320, a background model of the scene is generated by one or more processors associated with the depth camera based at least in part on the depth image i. For example, the background model may be generated based on the depth image i captured by a single depth camera exclusively, or based on a plurality of depth images, including the depth image i, that were captured by a plurality of depth cameras. Depth data included within such depth images may be fused with one another to define the background model.

At box 325, the value of the step variable i is incremented by one, or i=i+1. At box 330, a depth image i is captured using the depth camera, and at box 335, a number of degraded pixels within one or more designated regions of the depth image i is determined. In some implementations, a number of degraded pixels within regions of the depth image i may correspond to a subset of the photoreceptors of the sensor that are supersaturated by the reflected light. For example, the degraded pixels may be supersaturated pixels that are identified as degraded by comparing raw values of such pixels to one or more thresholds. In some implementations, a pixel may be identified as degraded where a raw value for the pixel equals a clipping value for a photoreceptor, e.g., 0 or 4,095 for a twelve-bit sensor, for one or more sampled phases with respect to an illumination. For example, a continuous wave time-of-flight camera may capture four samples, e.g., at four phases, each phase-stepped by ninety degrees (viz., zero, ninety, one hundred eighty or two hundred seventy degrees). Alternatively, a pixel may be identified as degraded where a raw value for the pixel meets or exceeds a predetermined threshold identified with respect to the clipping value for a corresponding photoreceptor, in one or more sampled phases. Alternatively, pixels of the depth image i may be identified as degraded on any other basis. For example, a pixel may be identified as degraded where a photoreceptor has failed, where circuitry or logic for determining values of such pixels are not functioning properly, or on any other basis. Moreover, such pixels may be identified for an image as a whole, e.g., where the designated region of the depth image i consists of the image in its entirety, or for one or more subsets of the depth image i, e.g., portions of the depth image i corresponding to floors or travelling surfaces.

At box 340, a ratio of the number of degraded pixels to a total number of pixels within the designated region. At box 350, whether the ratio exceeds a predetermined threshold is determined. The predetermined threshold may be set on any basis, such as one-tenth of one percent, one-half of one percent, or one percent (0.1%, 0.5%, 1.0%), or any other value.

If the ratio exceeds the predetermined threshold, then the process advances to box 355, where the background model is not updated based on the depth image i. For example, where the depth image i is saturated or otherwise degraded beyond a predetermined threshold, updating a background model of a scene based on the depth image i implies that the composition of the background features on the scene have changed, e.g., at locations in three-dimensional space corresponding to the saturated or otherwise degraded pixels within the depth image i, when, in reality, the background features on the scene have not changed.

If the ratio does not exceed the predetermined threshold, however, then the process advances to box 360, where the background model is updated based on the depth image i. In some implementations, where a background model of a scene is generated or updated by one or more processors associated with an imaging device, the background model or other representation may be provided to a server or other computer device or system in communication with the imaging device and a plurality of other imaging devices. At box 370, whether the continued monitoring of the scene by depth images is desired is determined. If the continued monitoring of the scene is desired, then the process returns to box 325, where the value of the step variable i is again incremented by one, or i=i+1, and to box 330, where another depth image i is captured using the depth camera. If the continued monitoring of the scene is no longer desired, however, then the process ends.

Referring to FIGS. 4A through 4G, views of aspects of one system for detecting or locating actors in accordance with implementations of the present disclosure are shown. Except where otherwise noted, reference numerals preceded by the number "4" shown in FIGS. 4A through 4G indicate components or features that are similar to components or features having reference numerals preceded by the number "2" shown in FIG. 2A or 2B, or by the number "1" shown in FIGS. 1A through 1I.

Figure 4A:
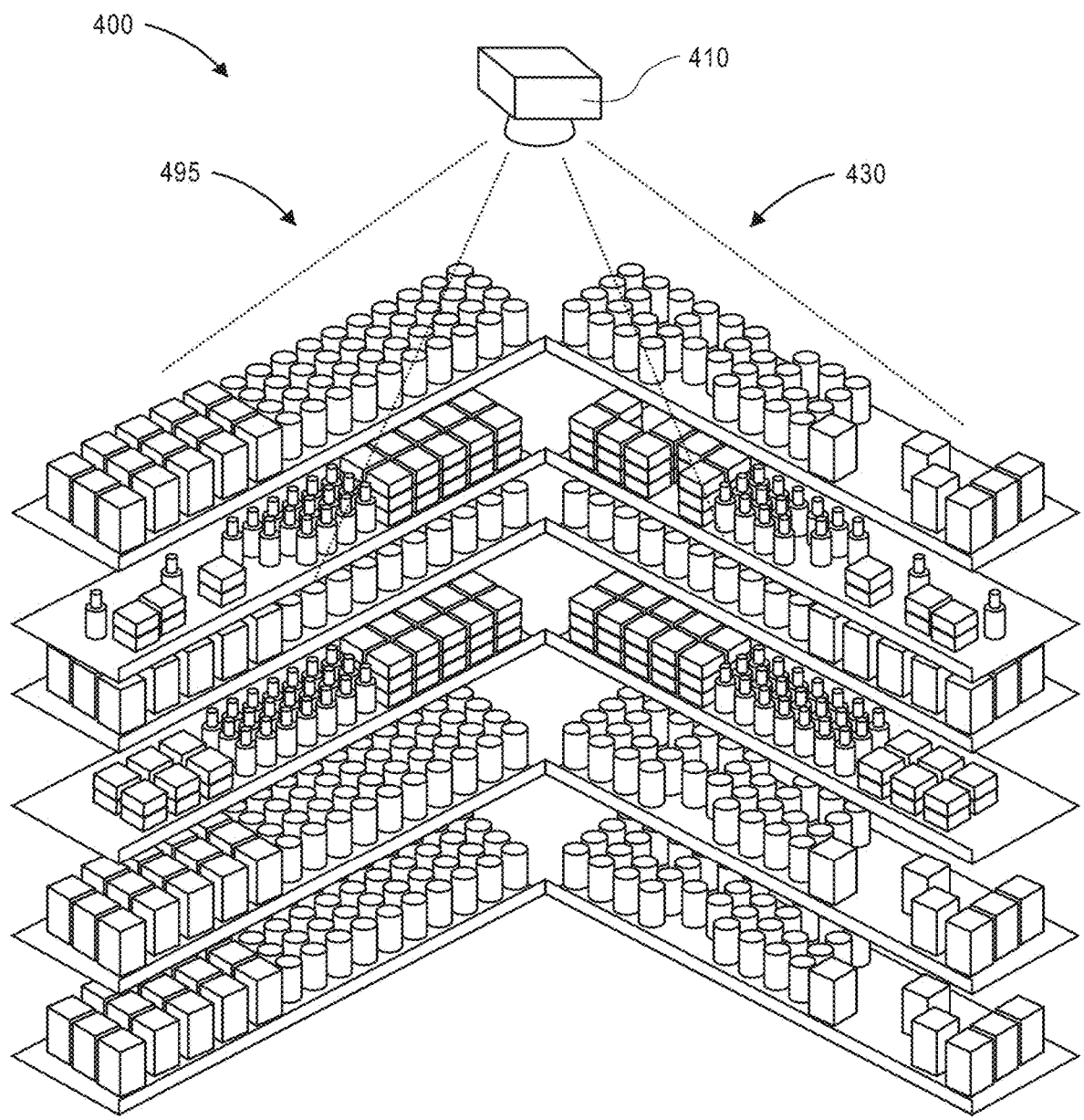
FIGS. 4A through 4G are views of aspects of one system for detecting or locating actors in accordance with implementations of the present disclosure.
Figure 4B:
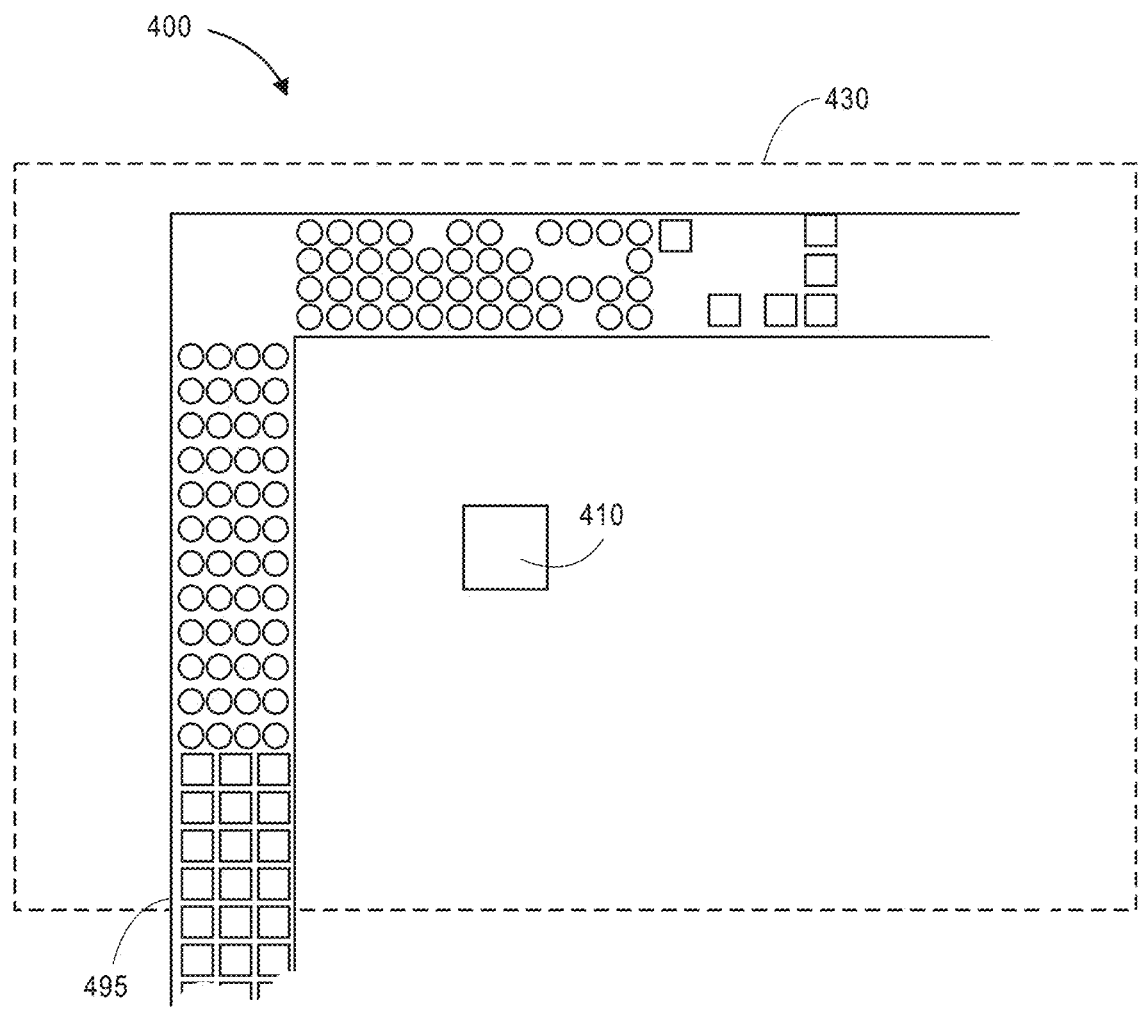

As is shown in FIGS. 4A and 4B, a system 400 includes a depth camera 410 (e.g., a time-of-flight camera) mounted above a shelving unit 495, which includes a plurality of sets of shelves having items thereon. The depth camera 410 is configured to capture imaging data (e.g., depth images) from a field of view 430 that includes the shelving unit 495 as well as one or more floors or traveling surfaces within a scene. For example, as is shown in FIGS. 4A and 4B, the depth camera 410 is mounted above the shelving unit 495 and configured to capture depth images regarding motion of one or more actors on the scene. In some implementations, the depth camera 410 may be an RGBD camera or a component thereof that is configured to capture both visual images and depth images from the scene.

Figure 4C:
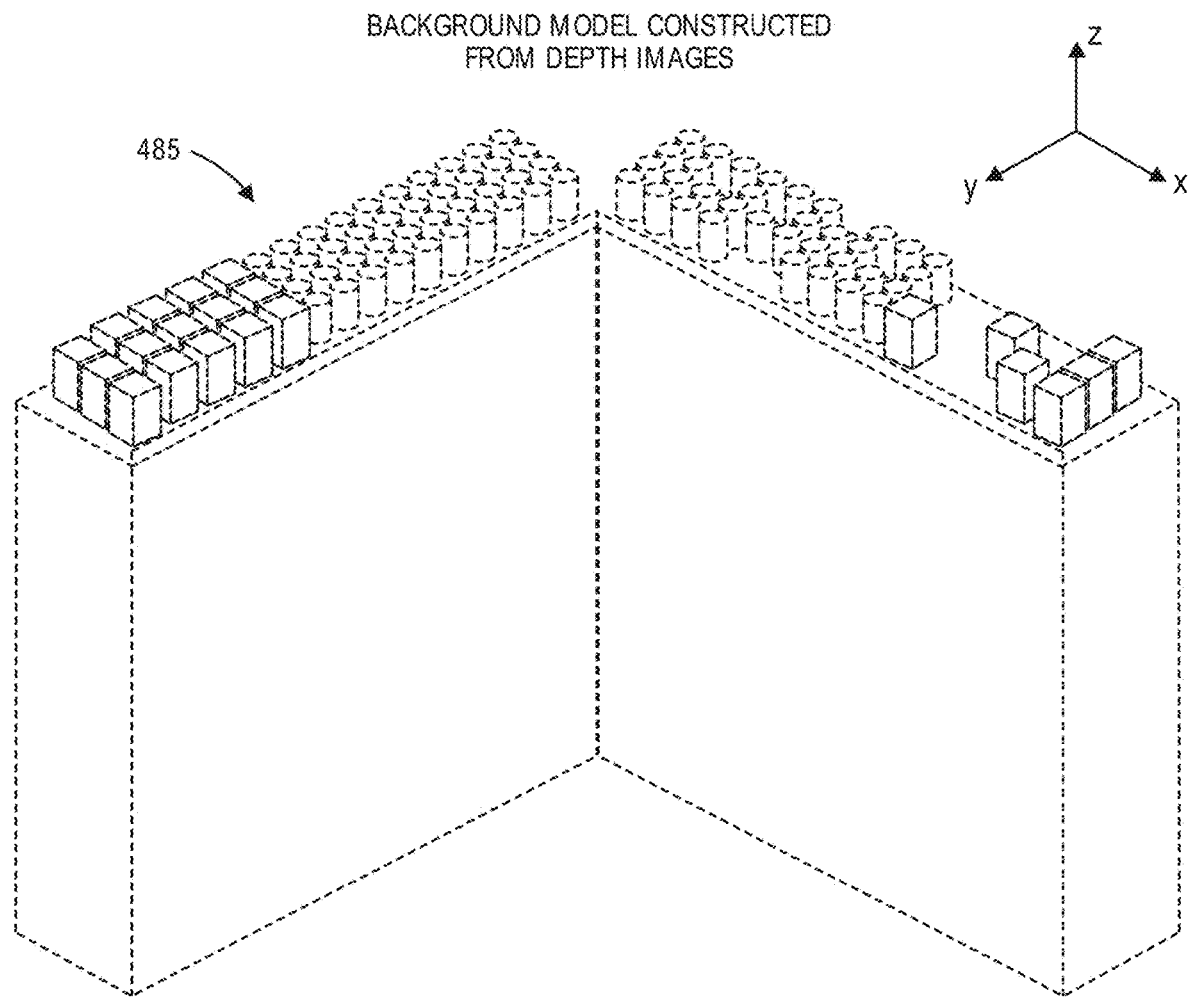

As is shown in FIG. 4C, a background model 485 of the scene may be generated based on depth images captured using the depth camera 410. The background model 485 may represent positions of a plurality of points in three-dimensional space on the scene, as determined based on the depth images. Alternatively, in some implementations, the background model 485 of the scene may be generated based on depth images captured using the depth camera 410 and any number of other depth cameras (not shown). In such implementations, depth data captured by each of such depth cameras, including the depth camera 410, may be fused to generate the background model 485 accordingly.

Figure 4D:
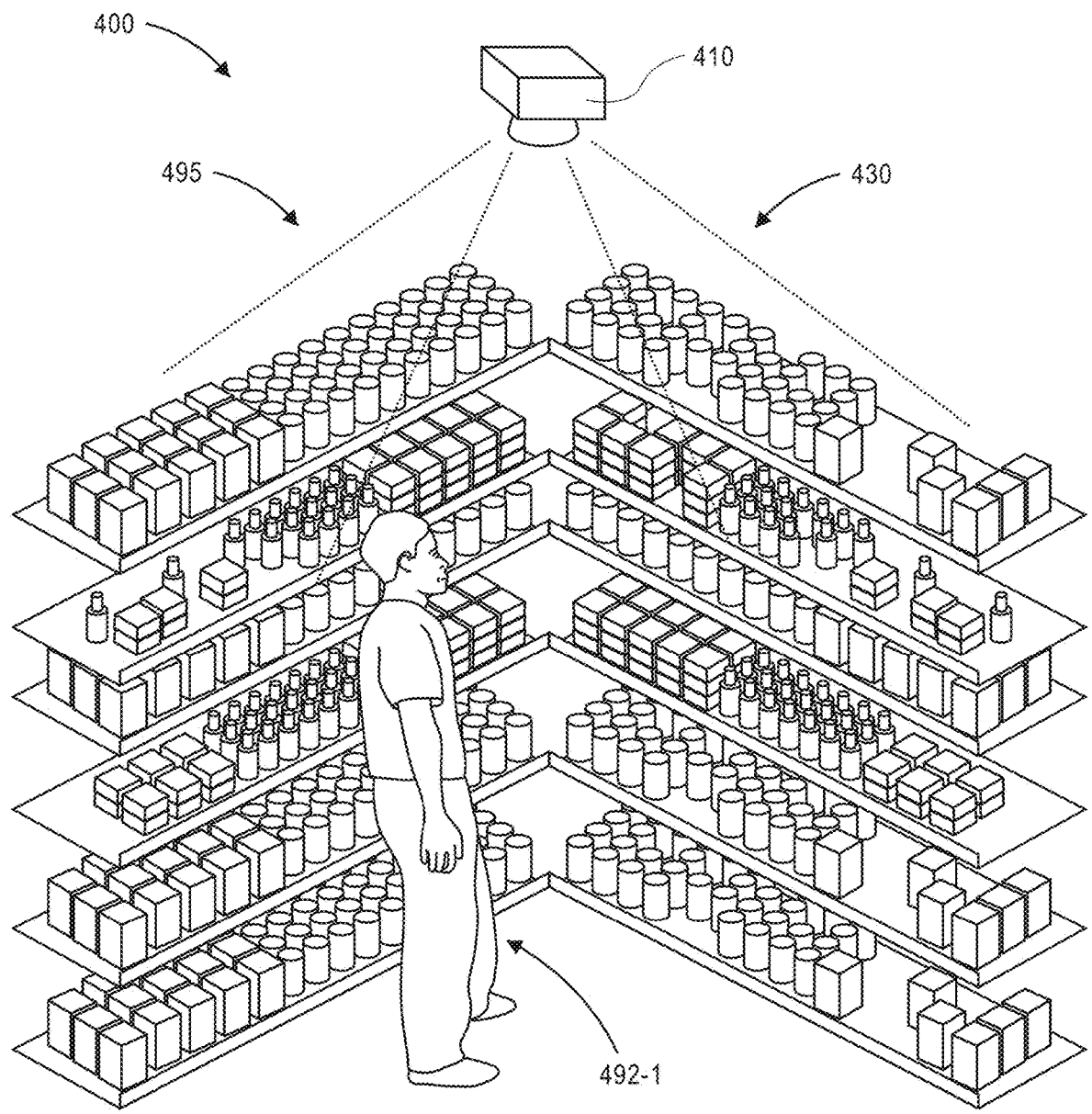
Figure 4E:
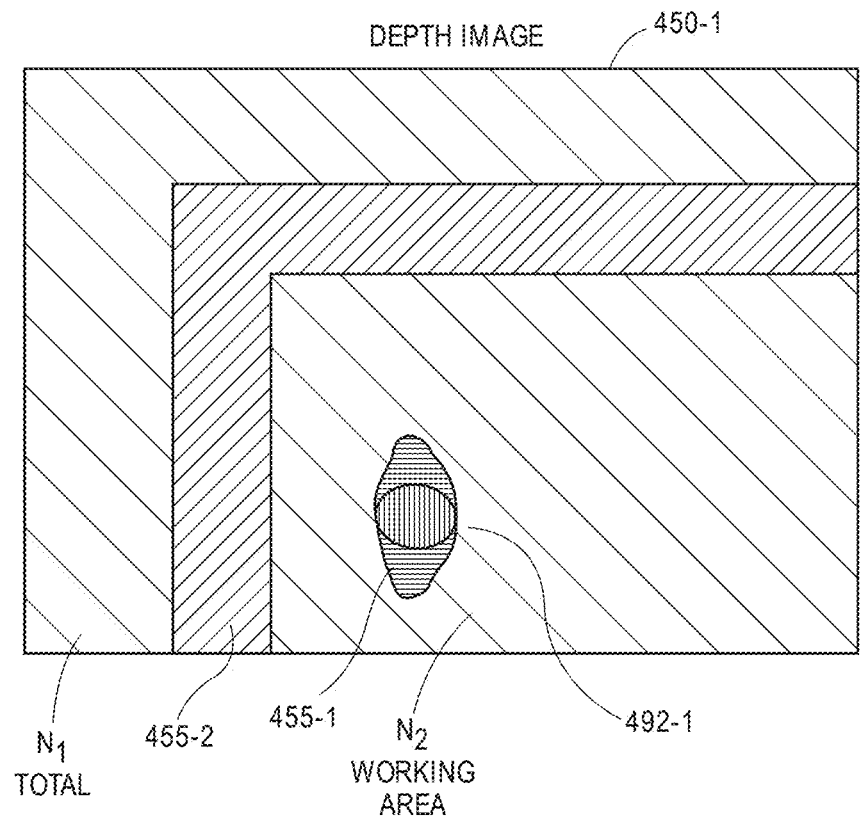

As is shown in FIGS. 4D and 4E, the depth camera 410 may capture one or more depth images, viz., a depth image 450-1, as an actor 492-1 appears on the scene and executes one or more interactions with the storage unit 495, or executes one or more other poses or gestures. As is shown in FIG. 4D, the actor 492-1 is not wearing, carrying or otherwise associated with (e.g., near) any retroreflective materials. As is shown in FIG. 4E, the depth image 450-1 includes a region 455-1 of pixels corresponding to the actor 492-1 and a region 455-2 of pixels corresponding to the storage unit 495. Because the actor 492-1 is not wearing, carrying or otherwise associated with any retroreflective materials, the region 455-1 includes varying values of distances corresponding to aspects of the actor 492-1, including a head, shoulders, or other body parts of the actor 492-1.

The depth image 450-1 may be processed to calculate a ratio of saturated or otherwise degraded pixels within the depth image 450-1 in order to determine whether the background model 485 should be updated based on the data included in the depth image 450-1. For example, as is shown in FIG. 4E, because the actor 492-1 is not wearing, carrying or otherwise associated with any retroreflective material, a number of supersaturated or otherwise degraded pixels $N_D$ on the scene is approximately zero. Thus, a ratio of the number of degraded pixels $N_D$ to a total number of pixels $N_1$ in the depth image 450-1, or a number of pixels $N_2$ in a working area (e.g., an area where actors such as the actor 492-1 may congregate or execute one or more interactions with the shelving unit 495 or other poses or gestures) is likewise zero. Where the ratios $N_D/N_1$ and/or $N_D/N_2$ are zero or otherwise below a selected threshold, depth values of the depth image 450-1 may thus be used to update the background model 485.

Figure 4F:
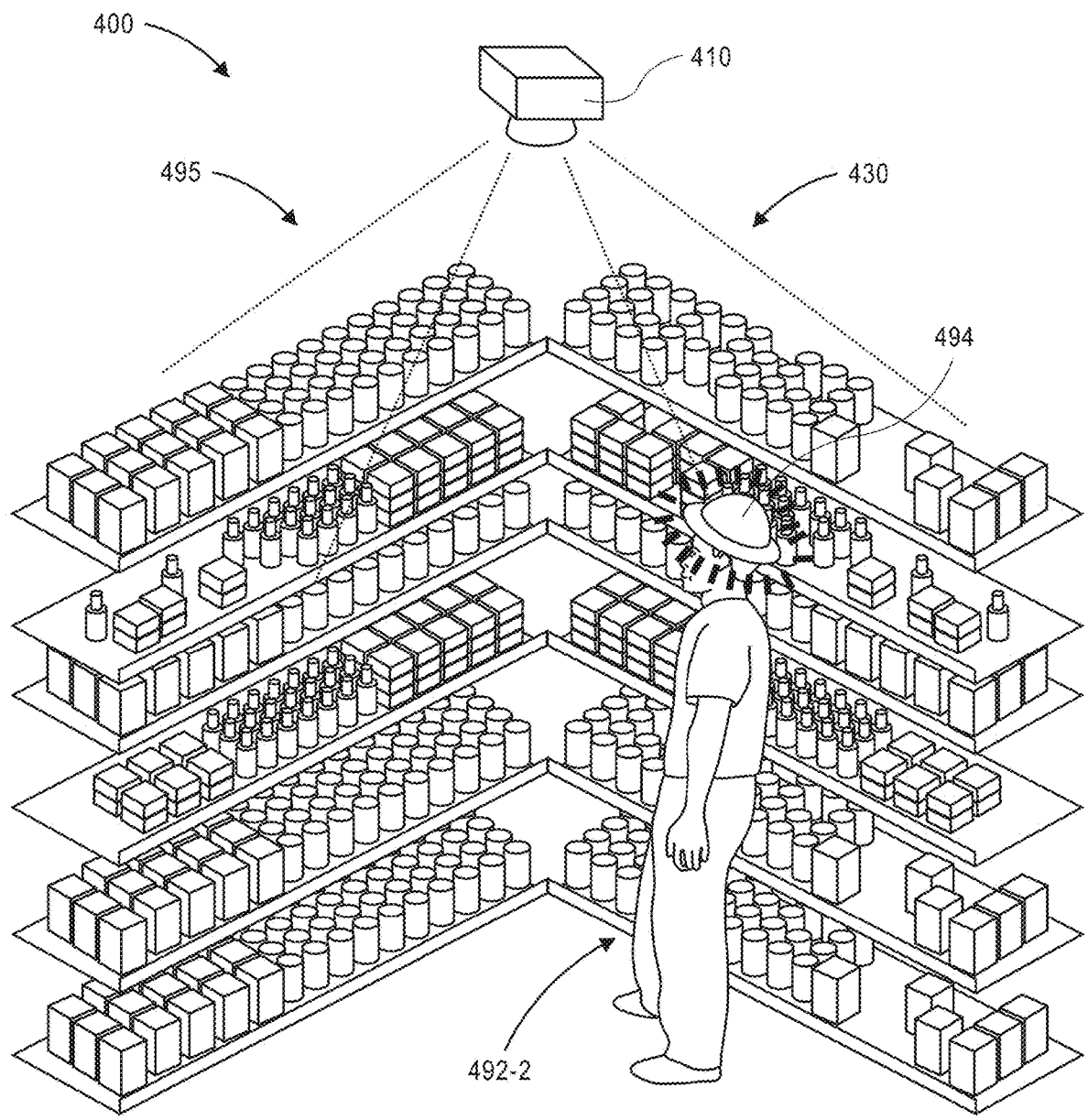
Figure 4G:
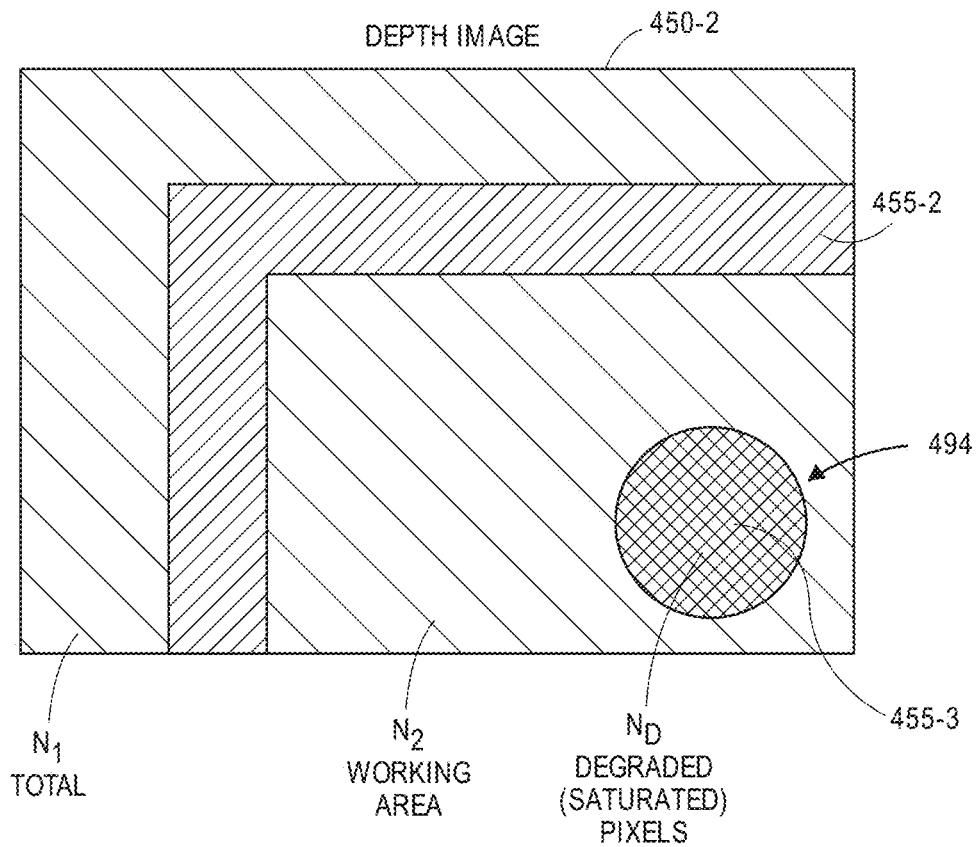

As is shown in FIGS. 4F and 4G, the depth camera 410 may also capture one or more depth images, viz., a depth image 450-2, as an actor 492-2 appears on the scene and executes one or more interactions with the storage unit 495. As is shown in FIG. 4F, the actor 492-2 is wearing a retroreflective hat 494. As is shown in FIG. 4G, the depth image 450-2 includes the region 455-2 corresponding to the storage unit 495 and a region 455-3 of supersaturated pixels corresponding to the retroreflective hat 494 worn by the actor 492-2.

The depth image 450-2 may be processed to calculate a ratio of saturated or otherwise degraded pixels within the depth image 450-2 in order to determine whether the background model 485 may be updated based on the data included in the depth image 450-2. For example, as is shown in FIG. 4G, because the actor 492-2 is wearing the retroreflective hat 494, a substantial, non-zero number of supersaturated or otherwise degraded pixels $N_D$ on the scene is present within the depth image 450-2. Thus, ratios of the number of degraded pixels $N_D$ to the total number of pixels $N_1$ in the depth image 450-2, or to the number of pixels $N_2$ in the working area (e.g., an area where actors such as the actor 492-2 may congregate or execute one or more interactions with the shelving unit 495) are also substantial and not zero. Therefore, due to the presence and number of the supersaturated pixels within the depth image 450-2, viz., the region 455-3 of supersaturated pixels, the values of the depth image 450-2 may not be used to update the background model 485 where the ratios $N_D/N_1$ and/or $N_D/N_2$ exceed the predetermined threshold.

Figure 5A:
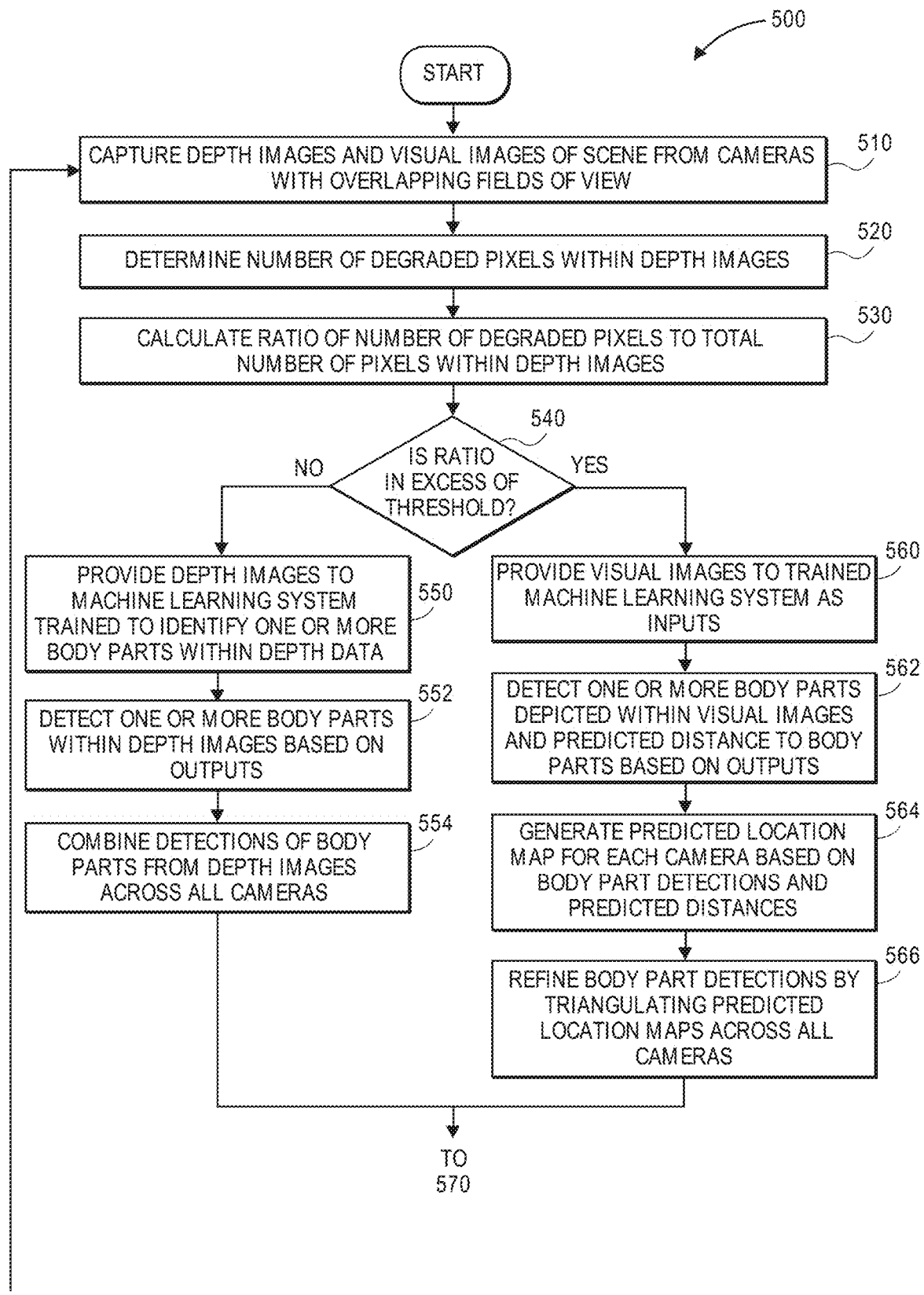
FIGS. 5A and 5B are a flow chart of one process for detecting or locating actors in accordance with implementations of the present disclosure.
Figure 5B:
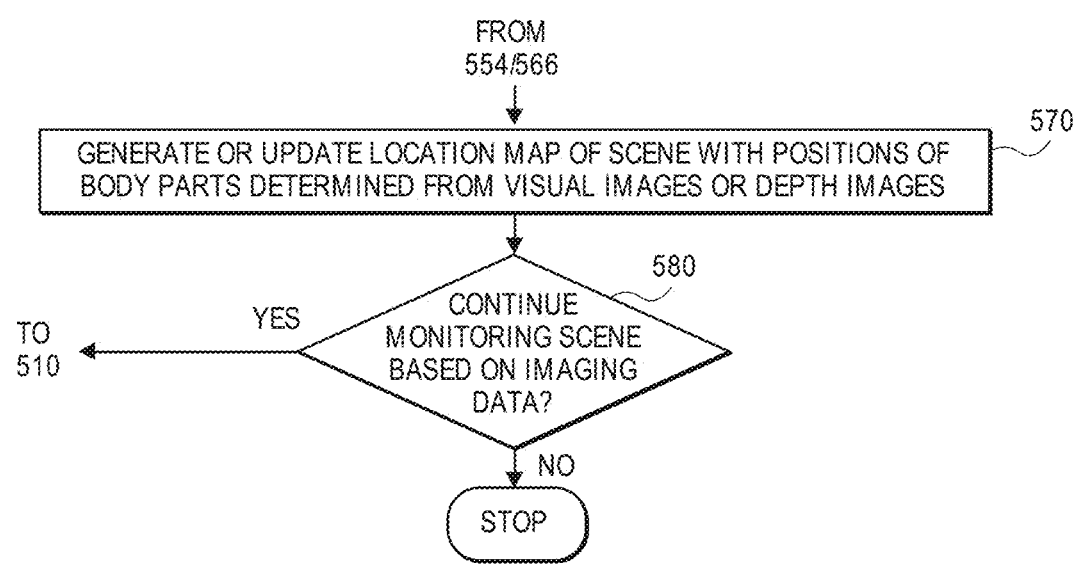

Referring to FIGS. 5A and 5B, a flow chart of one process for detecting or locating actors in accordance with implementations of the present disclosure is shown. At box 510, a plurality of depth images and visual images of a scene are captured using cameras having fields of view that overlap on a scene. For example, in some implementations, the cameras may have both depth sensors and visual sensors, viz., RGBD cameras, and may be configured to capture both depth images and visual images. In some other implementations, however, one or more of the cameras may have only depth sensors, or only visual sensors, and may be configured to capture either depth images or visual images, but not both.

At box 520, a number of degraded pixels within one or more of the depth images is determined. For example, a number of depth pixels that are identified as supersaturated, or to otherwise have raw values above a saturation threshold, or other threshold, may be determined for each of the depth images. For example, in some implementations, for each of the one or more depth images, a number of sensor values that are equal to a clipping value in one or more of a plurality of phases may be counted. Alternatively, depth pixels that are determined to be degraded on any basis may be identified and counted. At box 530, a ratio of the number of degraded pixels determined at box 520 for each of the depth images to a total number of pixels within each of the depth images is calculated. In some implementations, the ratio may be calculated with respect to a total number of the pixels within the depth images. In some other implementations, the ratio may be calculated with respect to a number of the pixels within designated regions of the depth images, e.g., on floors or traveling surfaces.

At box 540, whether the ratio for a given depth image is in excess of a predetermined threshold is determined. If the ratio is not in excess of the predetermined threshold, then the process advances to box 550, where the depth images are provided to a machine learning system that is trained to identify one or more body parts within the depth imaging data. For example, the machine learning system may be a trained artificial neural network or any other machine learning tool or technique. The inputs to the machine learning system may include a single depth image captured using one of the cameras, e.g., where the machine learning system is operated by one or more processors of a camera that captured the depth image, or, alternatively, one or more depth images captured by one or more cameras, or another set of data generated based on one or more of the depth images.

At box 552, one or more body parts are identified within the depth images based on outputs received from the trained machine learning system. The body parts may be identified as points in absolute three-dimensional space, e.g., by sets of three coordinates, or with respect to a position of an image sensor, or on any other basis. For example, the body parts may be identified as points within image planes of the depth images, e.g., by sets of two coordinates, or with respect to one or more angles and/or radii. Alternatively, the one or more body parts may be identified from the depth images directly, e.g., where a depth profile determined from the depth images indicates the presence of one or more body parts on the scene.

At box 554, the body parts detected within depth images captured by all of the depth cameras are combined. For example, where a plurality of body parts are identified in two or more depth images captured using the various cameras, a record or set of information or data regarding the body parts, including but not limited to points in three-dimensional space of each of such body parts, may be generated and stored accordingly.

Alternatively, if a ratio for a given depth image exceeds the predetermined threshold, then the process advances to box advances to box 560, where the visual images captured at box 510 are provided to a machine learning system that is trained to identify one or more body parts within visual imaging data as inputs and/or to predict distances (or depths or ranges) to such body parts based on the visual imaging data. For example, the machine learning system may be trained to detect one or more objects, such as body parts of humans or other animals, structures, or the like, as well as one or more aspects of a materials handling facility, such as shelving units, tables, bins, racks, bars, hooks or any other features, and to determine distances (or depths or ranges) to such objects. In some implementations, the machine learning system may be a convolutional neural network, a deep learning neural network, or other machine learning tool or technique that operates on one or more processors on the imaging devices that captured the visual images and includes one or more output layers for predicting whether one or more pixels in an image received as an input depicts a given body part or other object, and for determining a confidence score associated with such predictions. In some implementations, one or more processors or processor units operating on other computer devices or machines, e.g., a server in communication with one or more imaging devices, may be configured to operate the machine learning system to detect the body parts or other objects within the images captured by the imaging device, or to associate such body parts or other objects with locations within such images, as well as to determine one or more distances (or depths or ranges) to such body parts or other objects. In some implementations, such processors or processor units may be provided in the same physical location as the digital camera, or in close proximity to the digital camera. In other implementations, the processors or processor units may be provided in one or more computer devices or machines in other locations, e.g., alternate or virtual locations, such as in a "cloud"-based environment. At box 562, one or more body parts depicted within the visual images are detected and distances (or depths or ranges) to such body parts are determined based on outputs received from the machine learning system.

At box 564, a predicted location map or image is generated for each camera based on the body parts or other objects depicted within the visual images, and distances (or depths or ranges) to such objects by that camera. For example, in some implementations, the location map may be a two-dimensional representation of positions of one or more body parts of a human actor, or other objects, as circles, bounding boxes, or other shapes corresponding to uncertainties in their respective positions, e.g., with respect to coordinates of a field of view of a camera that captured the visual images. In some implementations, the location map may be a three-dimensional representation of the positions of the body parts or other objects, e.g., as the circles, boxes or other shapes, and with heights corresponding to the distances from the imaging devices to such body parts. In such implementations, the actors or other objects may be expressed within the location map as cylinders, prisms or other three-dimensional shapes with respect to their positions within the visual images and the predicted distances to the actors or the other objects. In some implementations, the location map may be a point cloud or other three-dimensional representation of the scene from the perspective of the camera, or globally, and may include coordinates of points of body parts detected by that camera, or a set of data including such coordinates.

At box 566, the locations of body parts or other objects on the scene are further refined by triangulating the predicted location maps generated at box 564 across all of the cameras. For example, where the position maps generated at box 564 collectively indicate positions of detected body parts or other objects within close proximity of one another, triangulating the predicted location maps may resolve any discrepancies between the body parts as detected from each of the cameras, and may provide a more accurate account of the positions of the body parts based on visual images captured from a single imaging device alone. Alternatively, in some implementations, the predicted location maps need not be triangulated.

At box 570, after the detections of body parts within depth images have been combined across all cameras at box 554, or after the location maps have been generated or triangulated at box 564 or 566, the process advances to box 570, where a location map (or other model) of the scene is generated based on the visual images or the depth images. For example, where the ratios of saturation or other forms of degradation calculated at box 530 for the depth images captured at box 510 are sufficiently low, the location map (or model) may be generated based on the depth images exclusively or, alternatively, based on both the depth images and the visual images captured at box 510. Where the ratios are sufficiently high, however, the location map (or model) may be generated or updated based on the visual images alone, and the depth images need not be considered.

After the location map is generated or updated at box 570, the process advances to box 580, where whether the continued monitoring of the scene based on imaging data is desired is determined. If the continued monitoring of the scene based on imaging data is desired, then the process returns to box 510, where depth images and visual images of the scene are again captured by the cameras. If the continued monitoring of the scene based on imaging data is no longer desired, however, then the process ends.

In some implementations, each of a plurality of depth images and each of a plurality of visual images captured by an imaging device, e.g., an RGBD camera, at box 510 may be processed independently, such as according to box 550, box 552 and box 554 for depth images and according to box 560, box 562, box 564 and box 566 for visual images. Whether a location map of a scene is to be generated based on one or more depth images captured at a given time, or on one or more visual images captured at the given time, or both the depth images and the visual images, may be determined based on the extent to which pixels of one or more of the depth images are saturated or otherwise degraded, as may be determined based on a ratio of degraded pixels to total pixels, or in any other manner.

Referring to FIGS. 6A through 6E, views of aspects of one system for detecting or locating actors in accordance with implementations of the present disclosure are shown. Except where otherwise noted, reference numerals preceded by the number "6" shown in FIGS. 6A through 6E indicate components or features that are similar to components or features having reference numerals preceded by the number "4" shown in FIGS. 4A through 4G, by the number "2" shown in FIG. 2A or 2B, or by the number "1" shown in FIGS. 1A through 1I.

Figure 6A:
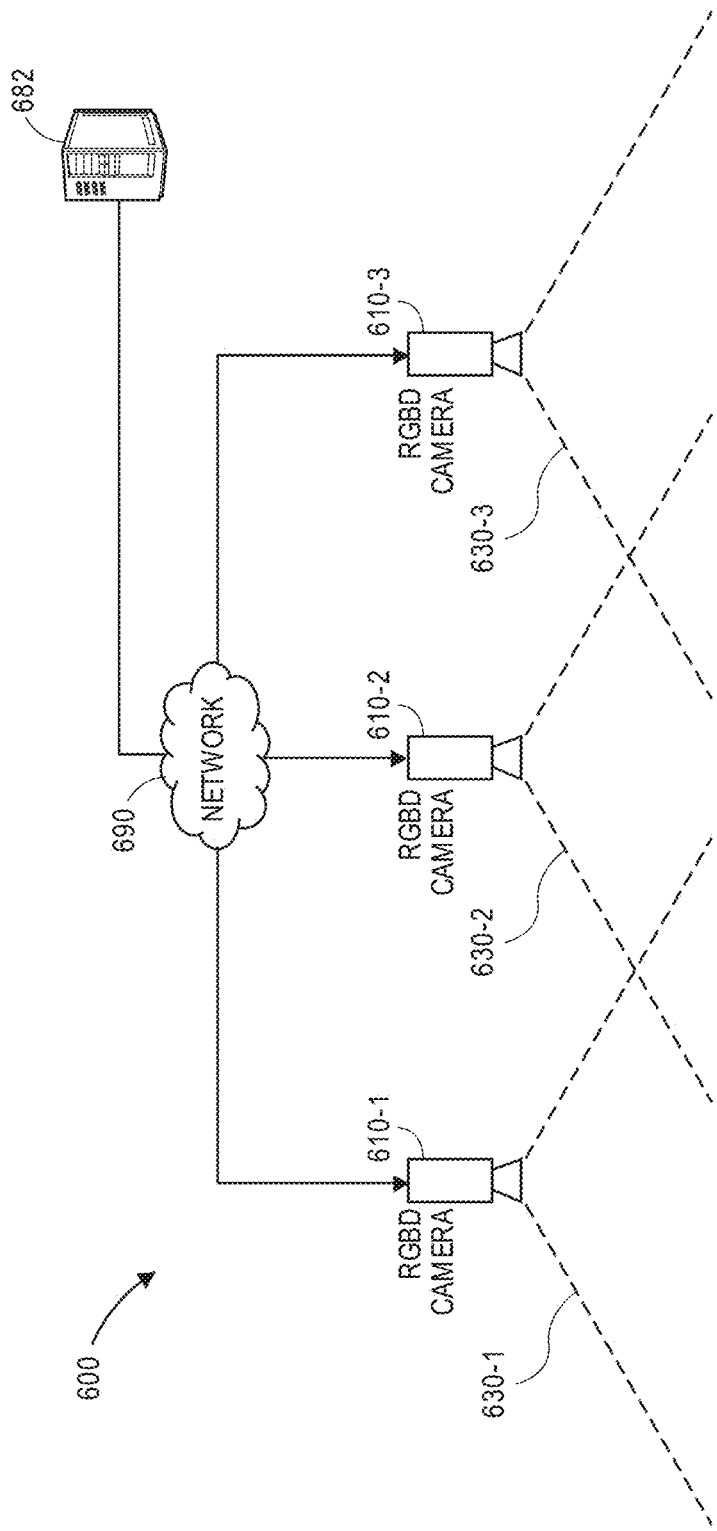

As is shown in FIG. 6A, a system 600 includes three RGBD cameras 610-1, 610-2, 610-3 and a server 682 that are connected to one another over a network 690, which may include the Internet in whole or in part. The first RGBD camera 610-1 has a first field of view 630-1. The second RGBD camera 610-2 has a second field of view 630-2. The third RGBD camera 610-3 has a third field of view 630-3. Each of the first field of view 630-1, the second field of view 630-2 and the third field of view 630-3 overlap with at least one other of the first field of view 630-1, the second field of view 630-2 and the third field of view 630-3, at least in part.

Figure 6C:
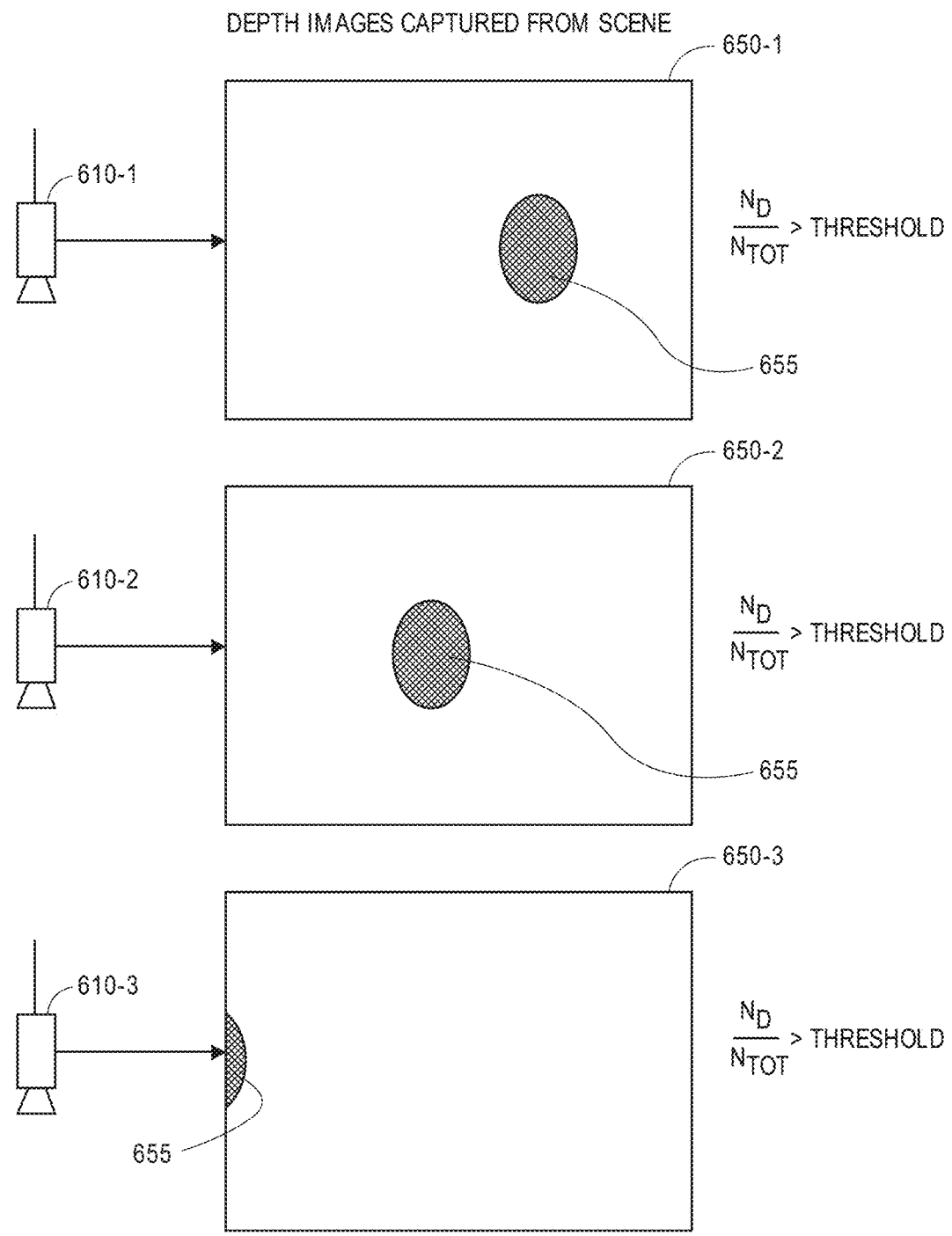

The RGBD cameras 610-1, 610-2, 610-3 may be programmed to capture depth images and visual images from their respective fields of view 630-1, 630-2, 630-3 as one or more actors enter thereon or travel therethrough. As is shown in FIG. 6B, an actor 692 wearing one or more retroreflective articles of clothing 694 passes within the fields of view 630-1, 630-2, 630-3. As is shown in FIG. 6C, a plurality of depth images 650-1, 650-2, 650-3 captured using each of the RGBD cameras 610-1, 610-2, 610-3 are determined to have ratios of numbers of degraded (e.g., supersaturated) pixels $N_D$ to total numbers of pixels $N_{TOT}$, or $N_D/N_{TOT}$, in excess of one or more thresholds. In particular, each of the depth images 650-1, 650-2, 650-3 includes a region 655 of pixels that are degraded by reflections from the retroreflective hat 694 worn by the actor 692.

Figure 6D:
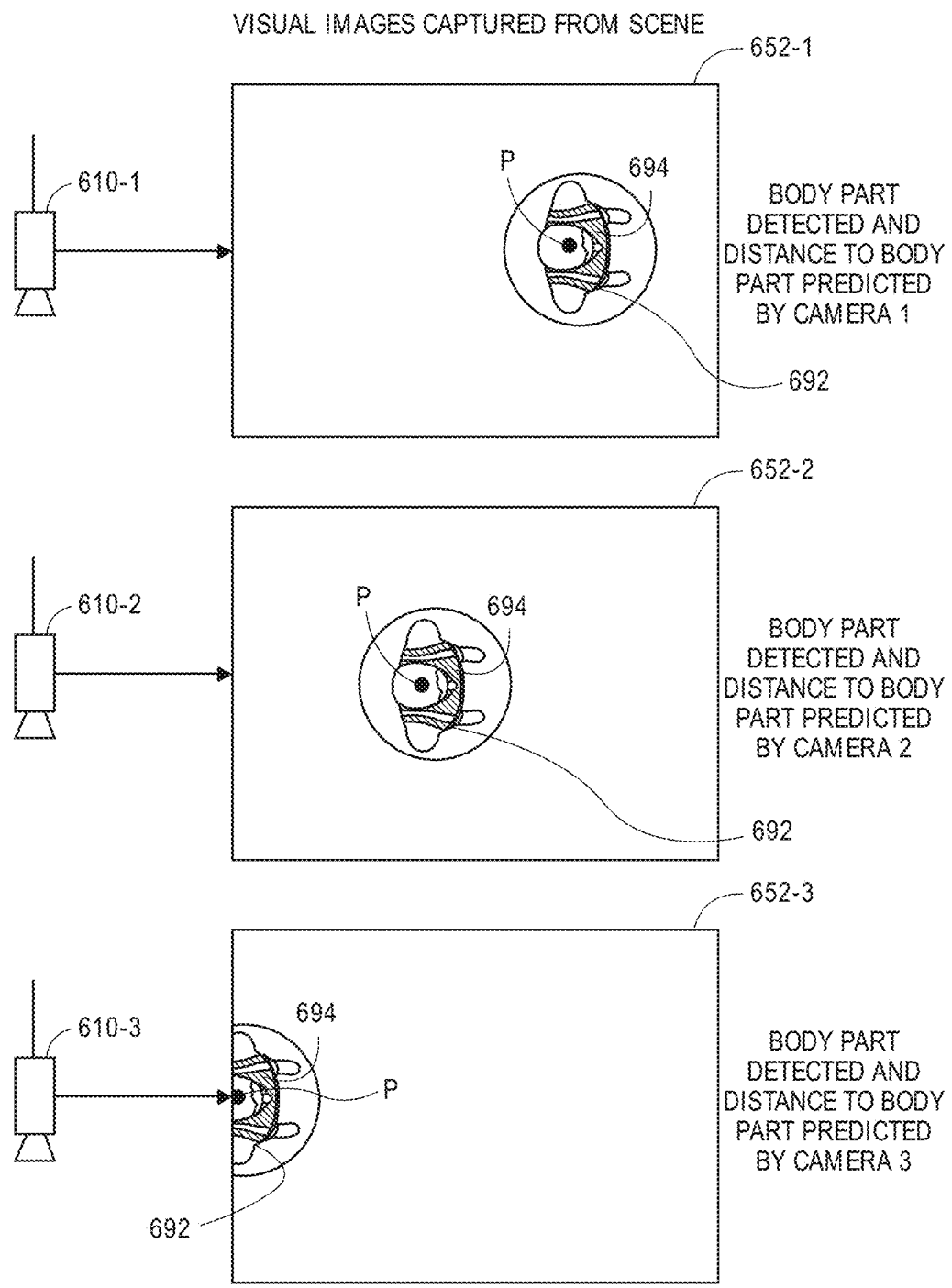

Because the ratios $N_D/N_{TOT}$ for the depth images 650-1, 650-2, 650-3 are in excess of predetermined thresholds, the depth images 650-1, 650-2, 650-3 are of insufficient quality to generate or update a location map (or model) of the scene to determine locations of the actor 692 or any other actors or objects thereon. Therefore, a location map (or model) of the scene may be generated based on positions of actors or objects, viz., the actor 692, determined based on visual images captured from the scene. As is shown in FIG. 6D, a plurality of visual images 652-1, 652-2, 652-3 captured by the RGBD cameras 610-1, 610-2, 610-3 each include body parts of the actor 692 at points P and predicted distances (or depths or ranges) to the actor 692 within the visual images 652-1, 652-2, 652-3. The body parts of the actor 692 at the points P may be identified by providing the visual images 652-1, 652-2, 652-3 to a trained machine learning system, e.g., a convolutional neural network, a deep learning neural network, or other machine learning tool or technique operating on the imaging devices 610-1, 610-2, 610-3 or, alternatively, by one or more external computer device or machines, as inputs, and by interpreting outputs received from the trained machine learning system. Alternatively, the body parts of the actor 692 at the points P may be determined in any other manner.

Figure 6E:
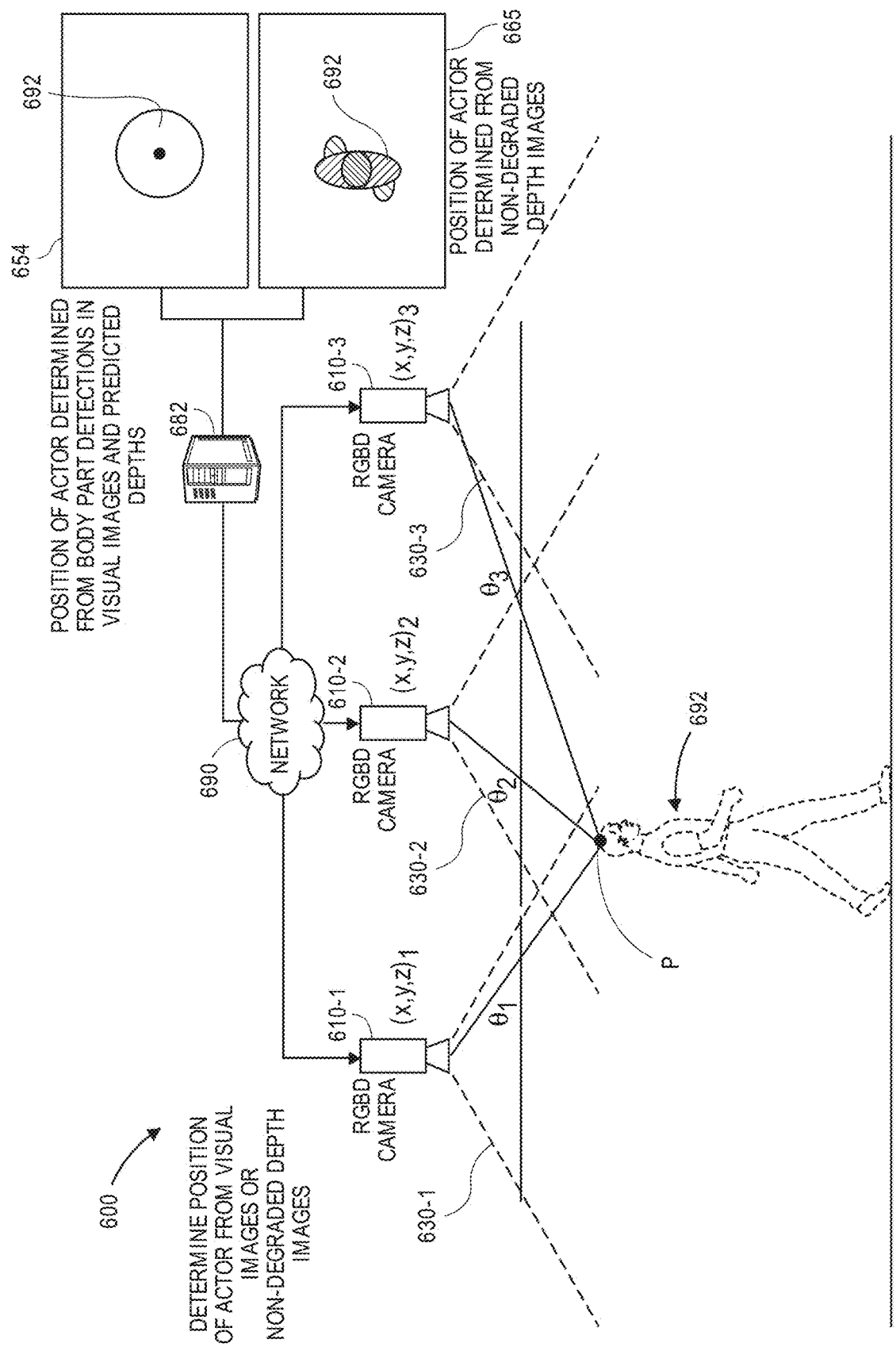

As is shown in FIG. 6E, a position of the point P in three-dimensional space may be further refined where the RGBD cameras 610-1, 610-2, 610-3 are calibrated, e.g., by extending rays from visual sensors of the respective RGBD cameras 610-1, 610-2, 610-3 through the points P within the image planes of the visual images 652-1, 652-2, 652-3 at angles $\theta_1$, $\theta_2$, $\theta 3$, and determining where such rays intersect, or by selecting one or more points based on such rays. The processes shown in FIG. 6E may be repeated for any body parts of any actors within the visual images captured using the RGBD cameras 610-1, 610-2, 610-3, or for any number of points corresponding to the actor 692, as detected within the respective visual images 652-1, 652-2, 652-3. Thus, as is shown in FIG. 6E, positions of the actor 692 may be determined based on depth images that are not degraded or, where depth images are degraded beyond a predetermined extent, based on visual images, including based on one or more body parts of the actor 692, or one or more predicted distances (or depths or ranges) to the actor 692, as determined based on the visual images 652-1, 652-2, 652-3.

Figure 7A:
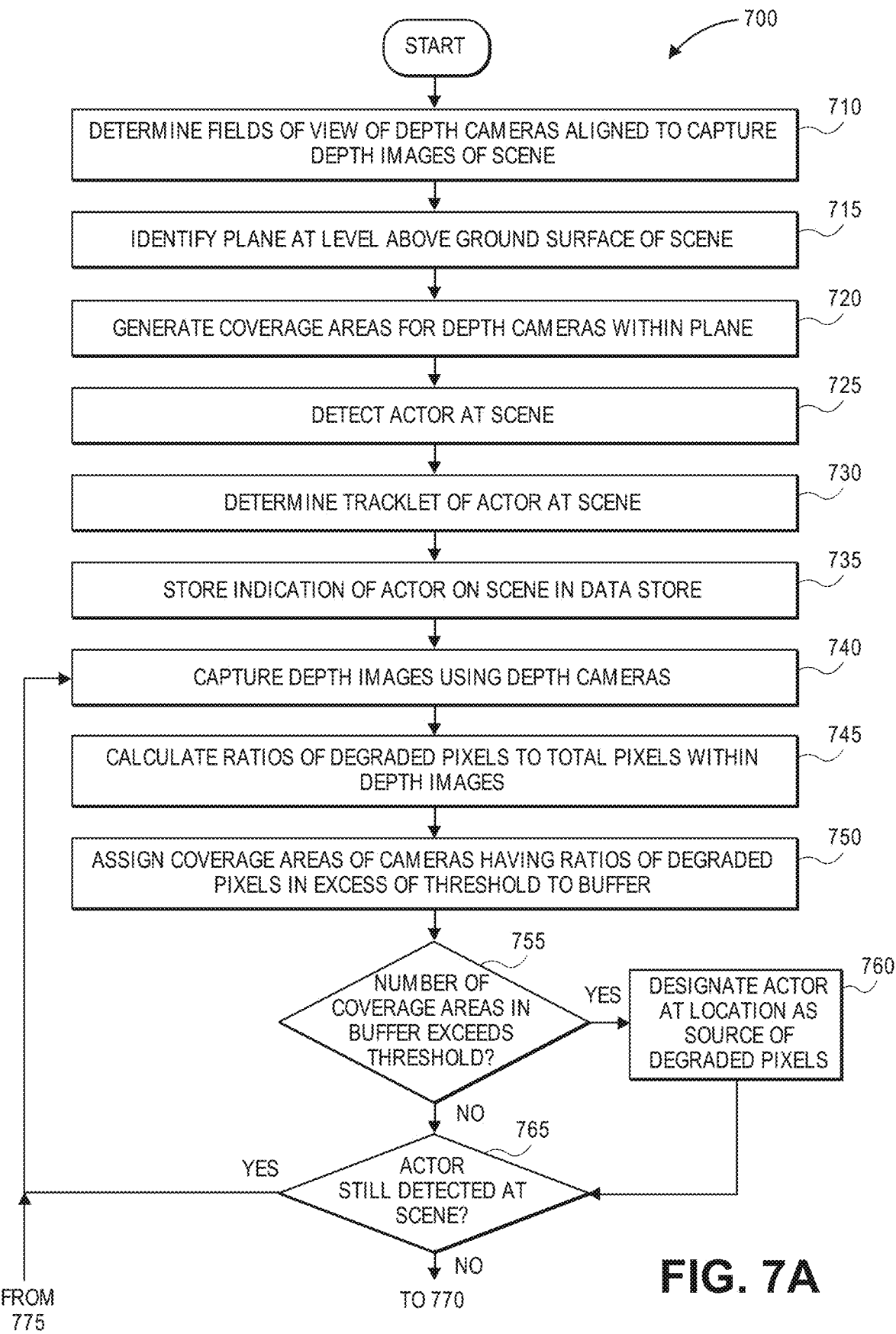
FIGS. 7A and 7B are a flow chart of one process for detecting or locating actors in accordance with implementations of the present disclosure.
Figure 7B:
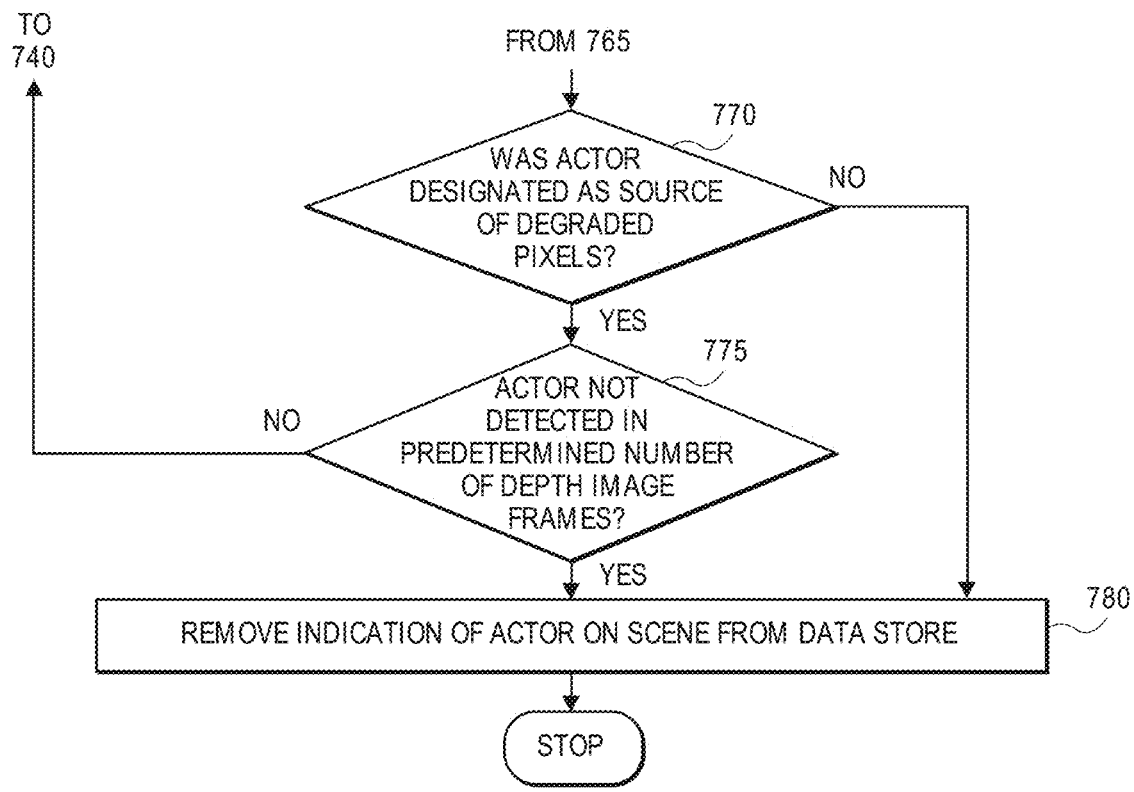

Referring to FIGS. 7A and 7B, a flow chart of one process for detecting or locating actors in accordance with implementations of the present disclosure is shown. At box 710, fields of view of depth cameras that are aligned to capture depth images of a scene are determined. For example, attributes of the fields of view may be determined based on a position of a depth sensor of a depth camera, as well as an angle of orientation of a lens of the depth camera, which may be used to determine points in space on the scene that are within the fields of view or are not within the fields of view. At box 715, a plane at a level above a ground surface of the scene is selected. For example, the plane may be identified based on a fixed distance above an actual ground surface that is, or is assumed to be, flat. Alternatively, the plane may be identified based on a fixed distance above an average elevation of a ground surface of the scene. In some implementations, the plane may be identified based on a distance from a ceiling, a roof or another structure. At box 720, coverage areas are generated for each of the depth cameras within the plane. In some implementations, the coverage areas may be defined based on intersections between the plane identified at box 715 and the fields of view determined at box 710. For example, assuming that a field of view of a depth camera determined at box 710 has a pyramidal shape, a coverage area may be defined as an intersection between the field of view and the plane identified at box 715. Alternatively, in some implementations, a coverage area may be defined for each depth camera in any manner.

At box 725, an actor is detected on a scene. The actor may be detected in any manner, including but not limited to differences between a location map (or model) of the scene defined and updated by depth images successively captured from the scene, or based on one or more visual images captured from the scene. At box 730, a tracklet of the actor on the scene is determined, e.g., based on two or more positions of the actor on the scene, as well as times at which the actor was present in such positions (e.g., time-stamps).

In some implementations, the actor may be detected, and the tracklet may be determined, on any basis. For example, the tracklet may be a trajectory of any length or duration that is representative of motion of the actor on the scene, and includes an identifier of the actor. Tracklets may be generated for each of a plurality of actors that are present on the scene. The tracklets may be representative of locations or motion of one or more body parts of the actor on the scene and may be generated based on the presence of such body parts within images captured by a single imaging device, e.g., from a common field of view, or within images captured by multiple imaging devices. The tracklets may be generated over a predetermined number or series of frames (e.g., tens of frames or more), subject to any compatibility or incompatibility parameters or constraints. At box 735, an indication of the actor on the scene is stored in a data store.

At box 740, depth images are captured from the scene using the depth cameras, and at box 745, ratios of degraded pixels to a total number of pixels within the depth images, e.g., each of the pixels within the depth images, or a number of the pixels within designated regions of the depth images, such as on one or more floors or traveling surfaces, are calculated.

At box 750, coverage areas of the cameras that have ratios of degraded pixels in excess of a predetermined threshold are assigned to a buffer. The coverage areas may be subsets of the plane at the level above the ground surface of the scene and may have any relative size or shape.

At box 755, whether the number of coverage areas in the buffer exceeds a predetermined threshold is determined. If the number of coverage areas in the buffer exceeds the predetermined threshold, the process advances to box 760, where the actor is designated as a source of the degraded pixels, such as a wearer of retroreflective material, e.g., vests, hats or other articles of clothing, or as otherwise being responsible for the degraded pixels.

After the number of coverage areas in the buffer is determined to not exceed the predetermined threshold at box 755, or after the actor has been designated as a source of the degraded pixels at box 760, the process advances to box 765, where whether the actor is detected on the scene is determined.

If the actor remains on the scene, then the process returns to box 740, where depth images are captured from the scene using the depth cameras, and to box 745, where ratios of degraded pixels to the total numbers of pixels within the depth images are calculated. Whether the actor remains on the scene may be determined on any basis, such as based on one or more visual images, or in any other manner. Alternatively, in some implementations, whether the actor remains on the scene need not be considered, and in such implementations, the process may advance from box 755 to box 770.

If the actor is no longer detected on the scene, then the process advances to box 770, where whether the actor had been designated as a source of degraded pixels at box 760 is determined. If the actor has not been designated as a source of the degraded pixels at box 760, then the process advances to box 780, where an indication of the actor as being present on the scene is removed from the data store, and the process ends. For example, where the actor is not determined to be a source of degraded pixels, or where the actor is determined to be not wearing one or more articles of clothing having retroreflective material thereon, the fact that the actor is not detected on the scene indicates that the actor is not likely on the scene.

If the actor has been designated as a source of degraded pixels, however, then the actor may in fact be present on the scene, but may be undetectable on account of one or more articles of clothing having retroreflective materials thereon. The process then advances to box 775, where whether the actor has not been detected within a predetermined number of image frames is determined. For example, where one or more imaging devices are configured to capture imaging data at rates of fifteen frames per second, thirty frames per second, sixty frames per second, or at any other frame rate, an actor who has been designated as a source of degraded pixels may continue to be tracked for a predetermined number of depth image frames, e.g., five, ten, fifteen, twenty, or any other number, as if the actor remains on the scene despite the fact that the actor is not detected within any of the depth image frames. Alternatively, in some implementations, the actor may continue to be tracked for a corresponding period of time, rather than a predetermined number of frames. If the actor has not been detected within a predetermined number of image frames, the process advances to box 780, where an indication of the actor as being present on the scene is removed from the data store, and the process ends.

If the actor has been detected within the predetermined number of image frames, however, then the process returns to box 740, where depth images are captured from the scene using the depth cameras, and to box 745, where ratios of degraded pixels to the total numbers of pixels within the depth images are calculated.

Referring to FIGS. 8A through 8G, views of aspects of one system for detecting or locating actors in accordance with implementations of the present disclosure are shown. Except where otherwise noted, reference numerals preceded by the number "8" shown in FIGS. 8A through 8G indicate components or features that are similar to components or features having reference numerals preceded by the number "6" shown in FIGS. 6A through 6E, by the number "4" shown in FIGS. 4A through 4G, by the number "2" shown in FIG. 2A or 2B, or by the number "1" shown in FIGS. 1A through 1I.

Figure 8A:
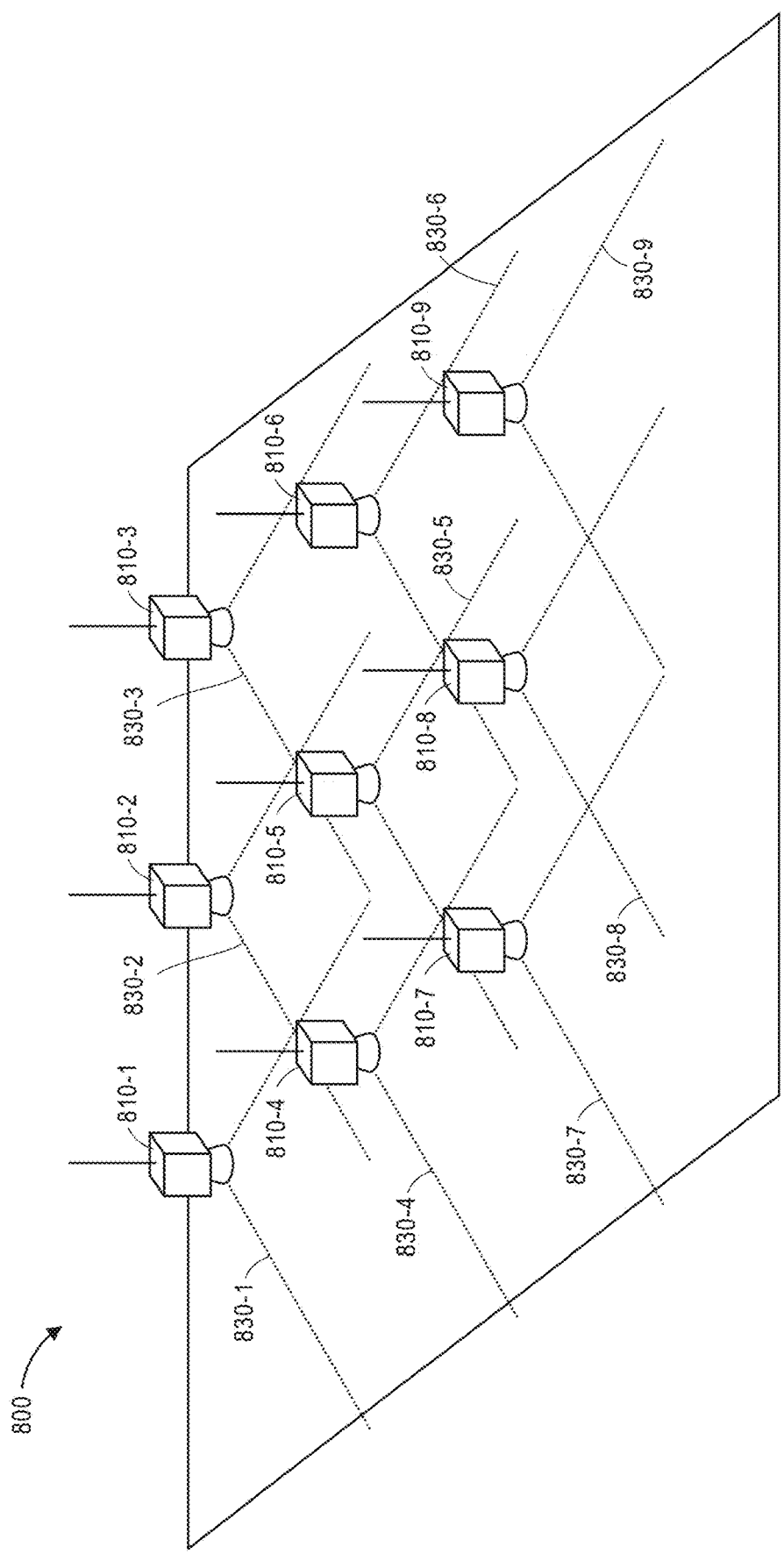
Figure 8B:
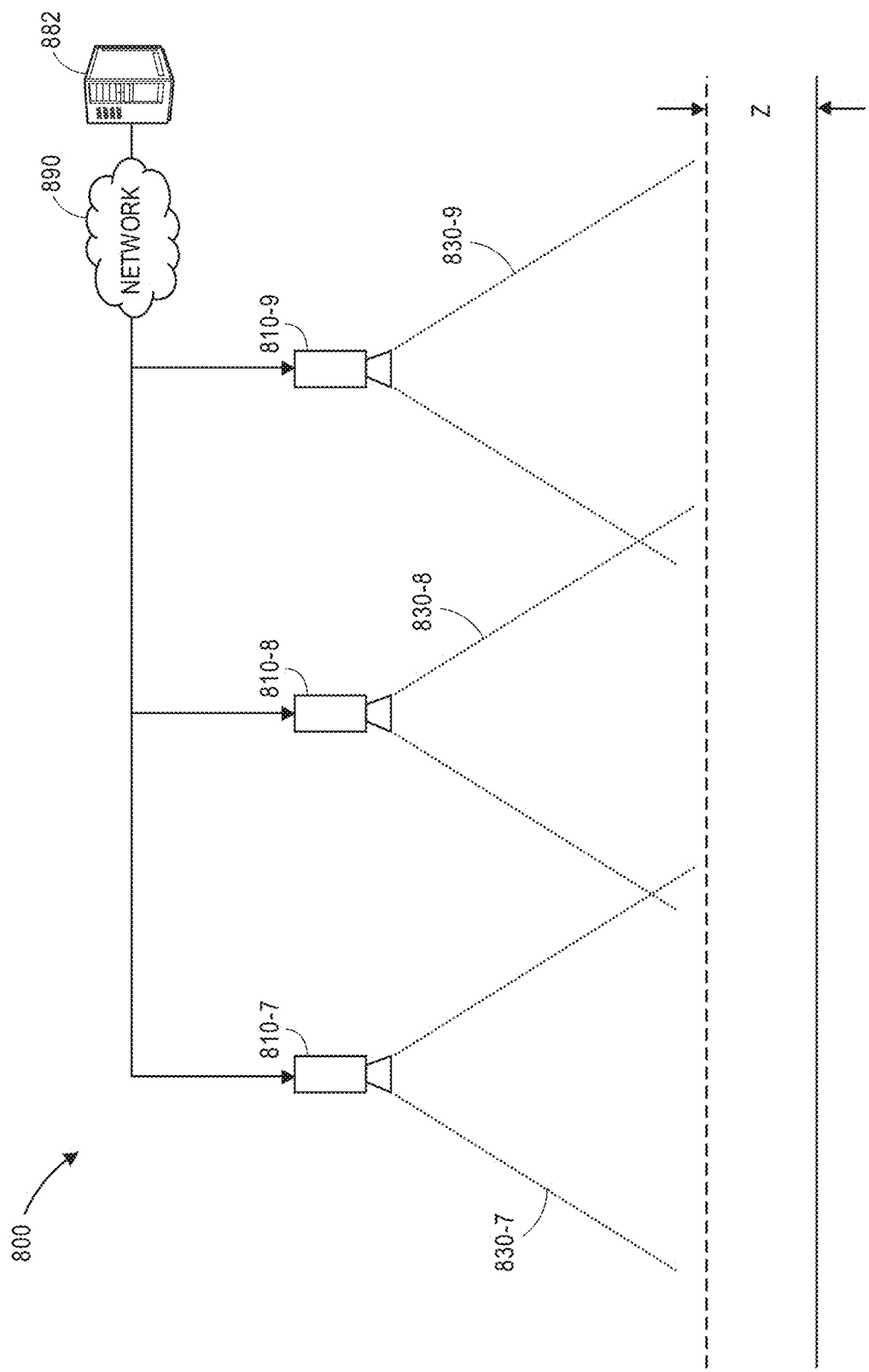

As is shown in FIGS. 8A and 8B, a system 800 includes a plurality of time-of-flight cameras 810-1, 810-2, 810-3, 810-4, 810-5, 810-6, 810-7, 810-8, 810-9 that are mounted in association with a facility (e.g., a materials handling facility). The time-of-flight cameras 810-1, 810-2, 810-3, 810-4, 810-5, 810-6, 810-7, 810-8, 810-9 have fields of view 830-1, 830-2, 830-3, 830-4, 830-5, 830-6, 830-7, 830-8, 830-9 that overlap at least in part.

Two-dimensional coverage areas of the respective fields of view 830-1, 830-2, 830-3, 830-4, 830-5, 830-6, 830-7, 830-8, 830-9 may be defined with respect to a distance z above a working surface on the scene. The distance z may be a nominal or average distance with respect to the working surface and may have any value. For example, in some implementations, the distance z may have a value of three hundred millimeters (300 mm) above the working surface, or any other value. The coverage areas for the fields of view 830-1, 830-2, 830-3, 830-4, 830-5, 830-6, 830-7, 830-8, 830-9 may be defined where a plane at the distance z from the working surface intersects frustrums of the fields of view 830-1, 830-2, 830-3, 830-4, 830-5, 830-6, 830-7, 830-8, 830-9. The coverage areas may be used to determine whether an actor is a source of supersaturated or otherwise degraded pixels. For example, because the coverage areas of the respective fields of view 830-1, 830-2, 830-3, 830-4, 830-5, 830-6, 830-7, 830-8, 830-9 overlap, retroreflective material in any location is likely to result in supersaturation of pixels in more than one of the coverage areas.

Thus, where multiple coverage areas include ratios of supersaturated or otherwise degraded pixels in excess of a predetermined threshold, the cause of the excessive ratios may be presumed to be the presence of retroreflective material, which may not only obscure depth pixels surrounding an object having the retroreflective material thereon but also cause depth pixels corresponding to the object to disappear or otherwise be degraded, rather than any one fault with any specific imaging device. Where the object is an actor on the scene, the retroreflective material may cause the actor to effectively disappear from depth imaging data even where the actor remains on the scene. An actor may be identified as a source of supersaturation or other degradation within depth imaging data where a number of coverage areas including supersaturated or otherwise degraded pixels exceeds a predetermined threshold. A detection or a tracklet of the actor may be presumed to remain on the scene for at least a predetermined number of depth image frames even where the depth image frames do not appear to depict the actor.

Figure 8C:
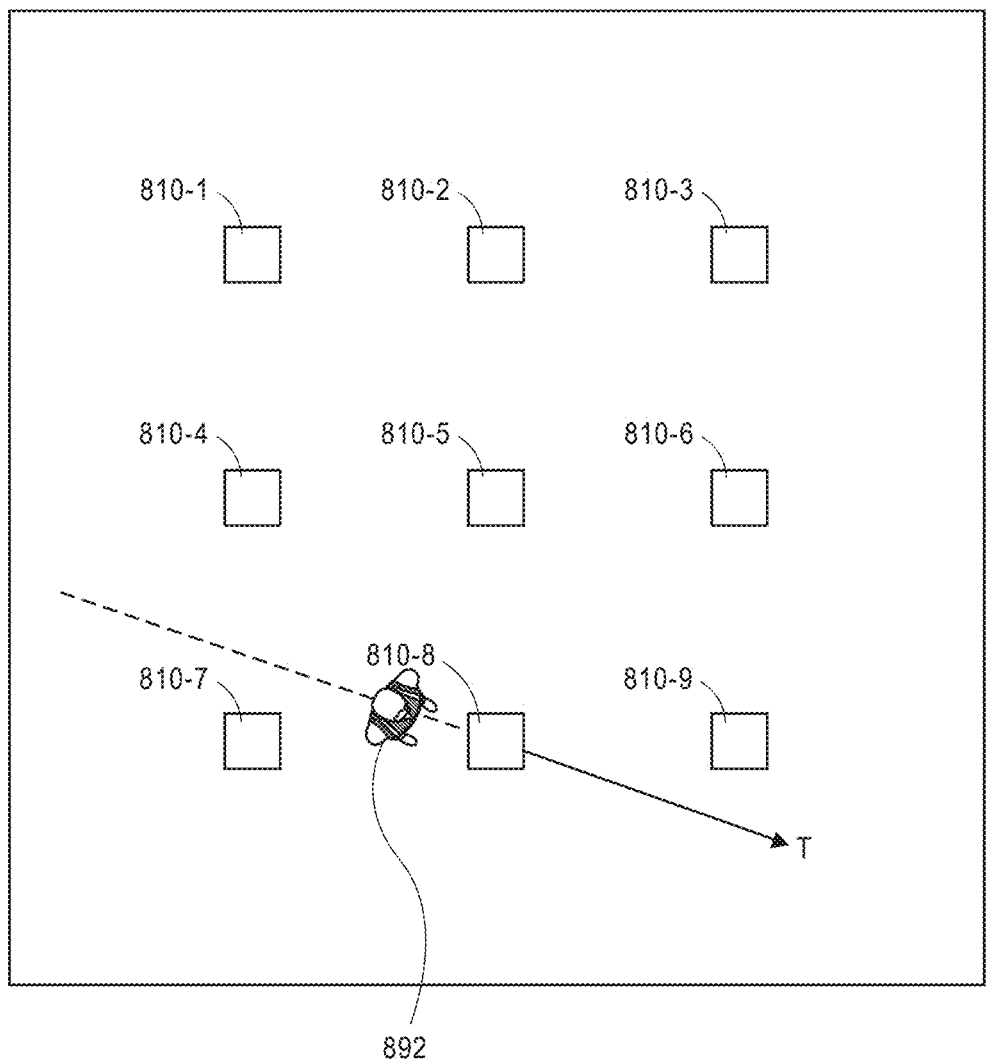
Figure 8D:
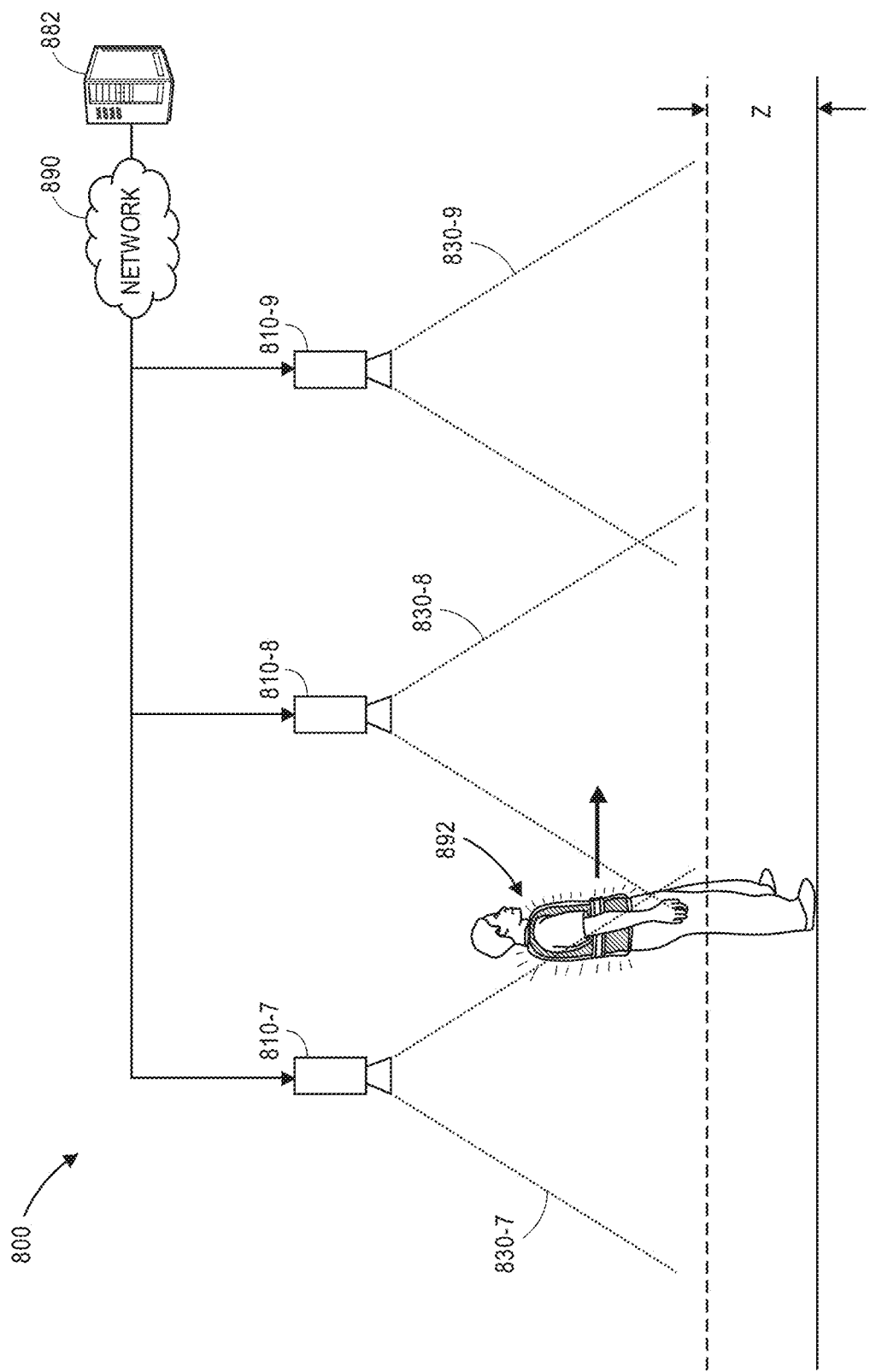

As is shown in FIGS. 8C and 8D, an actor 892 wearing retroreflective clothing 894 enters the scene and passes within the fields of view 830-1, 830-2, 830-3, 830-4, 830-5, 830-6, 830-7, 830-8, 830-9 of the time-of-flight cameras 810-1, 810-2, 810-3, 810-4, 810-5, 810-6, 810-7, 810-8, 810-9. The fields of view 830-1, 830-2, 830-3, 830-4, 830-5, 830-6, 830-7, 830-8, 830-9 are illuminated by illuminators within the time-of-flight cameras 810-1, 810-2, 810-3, 810-4, 810-5, 810-6, 810-7, 810-8, 810-9, and reflections of the light from surfaces within the scene, including but not limited to reflections of light from the retroreflective materials 894, are captured by sensors of the time-of-flight cameras 810-1, 810-2, 810-3, 810-4, 810-5, 810-6, 810-7, 810-8, 810-9.

As is shown in FIGS. 8E through 8G, a location of the actor 892 may be tracked where the number of coverage areas having excessive ratios of supersaturated or otherwise degraded pixels is greater than a predetermined threshold, such as two, three, four, five or six of such coverage areas. For example, as is shown in FIG. 8E, where coverage areas 835-4, 835-5, 835-7, 835-8 (viz., four of the coverage areas) defined with respect to fields of view 830-4, 830-5, 830-7, 830-8 are determined to include supersaturated or otherwise degraded pixels in excess of a predetermined threshold at time t0, the actor 892 may be determined to be a source of the supersaturated or otherwise degraded pixels, and one or more indications that the actor 892 is the source of the supersaturated or otherwise degraded pixels may be stored in one or more data stores.

Subsequently, as is shown in FIG. 8F, where coverage areas 835-4, 835-5, 835-6, 835-7, 835-8, 835-9 (viz., six of the coverage areas) defined with respect to the fields of view 830-4, 830-5, 830-6, 830-7, 830-8, 830-9 are determined to include supersaturated or otherwise degraded pixels in excess of a predetermined threshold at time $t_1$, the actor 892 may be determined to be located on the scene at a location where the coverage areas 835-4, 835-5, 835-6, 835-7, 835-8, 835-9 overlap at least in part, even if the actor 892 is not expressly identified within depth imaging data or visual imaging data captured using one or more of the time-of-flight cameras 810-1, 810-2, 810-3, 810-4, 810-5, 810-6, 810-7, 810-8, 810-9. As is shown in FIG. 8G, where coverage 835-8, 835-9 (viz., six of the coverage areas) defined with respect to the fields of view 830-8, 830-9 are determined to include supersaturated or otherwise degraded pixels in excess of a predetermined threshold at time t2, the actor 892 may be determined to be located on the scene at a location where the coverage areas 835-8, 835-9 overlap at least in part, even if the actor 892 is not expressly identified within depth imaging data or visual imaging data captured using one or more of the time-of-flight cameras 810-8, 810-9.

Although some of the implementations disclosed herein reference the use of time-of-flight cameras in materials handling facilities or like environments, those of ordinary skill in the pertinent arts will recognize that the systems and methods disclosed herein are not so limited, and may be utilized in connection with time-of-flight cameras that are provided for any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes represented in the flow chart of FIGS. 3, 5A and 5B, and 7A and 7B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
   a first imaging device having a first field of view, wherein the first imaging device comprises a first image sensor, a first time-of-flight sensor, a first computer processor and a first memory component; and
   a first shelving unit, wherein at least a portion of the first shelving unit is within the first field of view,
   wherein the first memory component has stored thereon executable instructions that, as a result of being executed by at least the first processor, cause the first imaging device to at least:
      capture a first visual image and a first depth image at a first time;
      determine that a first ratio of a first number of supersaturated pixels within the first depth image to a total number of pixels within the first depth image is less than a predetermined threshold;
      determine a first position of an actor at a first time based at least in part on the first depth image;
      capture a second visual image and a second depth image at a second time;
      determine that a second ratio of a second number of supersaturated pixels within the second depth image to a total number of pixels within the second depth image exceeds the predetermined threshold;
      in response to determining that the second ratio exceeds the predetermined threshold,
         detect a representation of the actor in at least a portion of the second visual image;
         predict a distance from the first imaging device to the actor based at least in part on the second visual image; and
         determine a second position of the actor at the second time based at least in part on the portion of the second image and the distance.

2. The system of claim 1, wherein the first imaging device further comprises a first illuminator having a continuous wave light source,
   wherein the first time-of-flight sensor comprises a first plurality of photoreceptors, and
   wherein the executable instructions, as a result of being executed by at least the first processor, further cause the first imaging device to at least:
      illuminate the first field of view by the first illuminator, wherein the first illuminator emits light in a plurality of phases over a first period of time, and wherein the first period of time includes the second time;
      expose the first sensor for at least a portion of the first period of time;
      determine a first plurality of values, wherein each of the first plurality of values corresponds to one of the first plurality of photoreceptors; and
      count a first number of the first plurality of values that are greater than or equal to a clipping value for each of the plurality of phases,
   wherein the first number of supersaturated pixels is the first number of the first plurality of values.

3. The system of claim 1, wherein the executable instructions, as a result of being executed by at least the first processor, further cause the first imaging device to at least:
   provide at least the second visual image as an input to a trained machine learning system operated by the first computer processor; and
   receive an output from the trained machine learning system in response to the input,
   wherein the distance is predicted based at least in part on the output.

4. A method comprising:
   capturing at least a first depth image and a first visual image of at least a portion of a scene of at least a portion of a facility by a first imaging device at a first time;
   determining that a first ratio of a first number of degraded pixels within the first depth image to a first number of pixels within the first depth image is not greater than a first threshold;
   determining a first position of an object within the facility at the first time based at least in part on the first depth image;
   generating a location map of at least the portion of the facility, wherein the location map indicates that the object is in the first position at the first time;
   capturing at least a second depth image and a second visual image of at least the portion of the scene by the first imaging device at a second time;
   determining that a second ratio of a second number of degraded pixels within the second depth image to a second number of pixels within the second depth image is greater than the first threshold; and
   in response to determining that the second ratio is greater than the first threshold,
      determining a second position of the object within the facility at the second time based at least in part on the second visual image, wherein determining the second position of the object comprises:
         detecting a representation of the object within at least a portion of the second visual image; and determining a first distance within the facility from the first imaging device to the object at the second time based at least in part on the second visual image,
wherein the second position of the object within the facility at the second time is determined based at least in part on the representation of the object and the first distance; and
updating the location map to indicate that the object is in the second position at the second time.

5. The method of claim 4, wherein determining the second position of the object at the second time further comprises:
providing at least the second visual image to a trained machine learning system as an input; and
receiving an output from the trained machine learning system,
wherein the output comprises the representation of the object and the first distance.

6. The method of claim 5, wherein the object is at least a portion of a human actor.

7. The method of claim 5, wherein the trained machine learning system is an artificial neural network trained for at least one of head detection or object segmentation.

8. The method of claim 4, wherein the first imaging device further comprises a first illuminator and a first sensor having a plurality of photoreceptors, and
wherein capturing at least the first depth image and the first visual image comprises:
projecting light into the first field of view by the first illuminator, wherein the light is projected in a plurality of phases; and
exposing the first sensor to light reflected from the scene in each of the plurality of phases during a first period of time, wherein the first depth image comprises first values for each of the plurality of photoreceptors corresponding to the exposure of the first sensor to light reflected from the scene during the first period of time, wherein the first period of time includes the first time, and
wherein determining that the first ratio of the first number of degraded pixels within the first depth image to the first number of pixels within the first depth image is not greater than the first threshold comprises:
identifying a first number of the photoreceptors having first values above a second threshold, wherein the threshold is defined with respect to a clipping value of at least one of the plurality of photoreceptors; and
dividing the first number of the photoreceptors having the first values above the second threshold by the first number of pixels within the first depth image,
wherein the first number of the photoreceptors having the first values above the second threshold is the first number of degraded pixels.

9. The method of claim 4, wherein the location map is generated based at least in part on a difference between the first depth image and a third depth image captured by the first imaging device prior to the first time.

10. The method of claim 4, wherein the first position of the object is determined based at least in part on the first depth image and a background model of at least the portion of the facility, and
wherein the method further comprises:
updating the background model based at least in part on the first depth image,
wherein the background model is not updated based on the second depth image.

11. The method of claim 4, wherein the first number of pixels within the first depth image is one of:
a total number of pixels within the first depth image; or
a number of pixels within the first depth image corresponding to a floor at the scene.

12. The method of claim 4, wherein the first threshold is one percent.

13. The method of claim 4, further comprising:
capturing at least a third depth image and a third visual image of at least the portion of the scene by a second imaging device at the second time;
determining that a third ratio of a third number of degraded pixels within the third depth image to a third number of pixels within the third depth image is greater than the first threshold; and
in response to determining that the third ratio is greater than the first threshold,
determining a third position of the object within the facility at the second time based at least in part on the third visual image, wherein determining the third position of the object comprises:
detecting a representation of the object within at least a portion of the third visual image; and
determining a second distance within the facility from the second imaging device to the object at the second time based at least in part on the third visual image,
wherein the third position of the object at the second time is determined based at least in part on the portion of the third visual image and the second distance, and
wherein the map of the scene is updated based at least in part on the third position.

14. The method of claim 13, wherein updating the location map further comprises:
extending a first line from a position of a first sensor of the first imaging device through a position corresponding to the portion of the second visual image;
extending a second line from a position of a second sensor of the second imaging device through a position corresponding to the portion of the third visual image; and
determining a position corresponding to an intersection of at least the first line and the second line,
wherein the location map is updated based at least in part on the intersection of at least the first ray and the second ray.

15. The method of claim 4, wherein the first imaging device is mounted in a materials handling facility having at least one storage unit in the portion of the scene.

16. The method of claim 15, where the materials handling facility further comprises a plurality of imaging devices mounted with fields of view including the at least one storage unit,
wherein the first imaging device is one of the plurality of imaging devices, and
wherein the method further comprises:
selecting a distance above a working surface of the materials handling facility; and
defining, for each of the plurality of imaging devices, a coverage area based at least in part on an intersection of a field of view of an imaging device and a plane at the distance above the working surface.

17. The method of claim 16, wherein capturing at least the second depth image and the second visual image of at least the portion of the scene by the first imaging device comprises:

capturing a plurality of depth images of at least the portion of the scene by the plurality of imaging devices at approximately the second time, wherein the second depth image is one of the plurality of depth images, and wherein determining that the second ratio of the second number of degraded pixels within the second depth image to the second number of pixels within the second depth image exceeds the first threshold comprises:

calculating ratios of numbers of degraded pixels within each of the depth images to numbers of pixels within each of the depth images, wherein the second ratio is one of the plurality of ratios;

determining that a number of the ratios exceeds a second threshold;

identifying a subset of the coverage areas, wherein each of the coverage areas of the subset corresponds to an imaging device that captured one of the depth images having a ratio exceeding the second threshold; and storing an indication that the object is a source of the degraded pixels in each of the coverage areas of the subset.

18. A system comprising:

a plurality of imaging devices having fields of view aligned vertically downward and in parallel above a surface, wherein each of the plurality of imaging devices comprises a visual sensor, an illuminator and a depth sensor, and wherein each of the depth sensors comprises a plurality of photoreceptors; and a computer server having at least one computer processor, wherein the computer server is in communication with each of the plurality of imaging devices, wherein the computer server is programmed within at least a plurality of instructions that, when executed by the at least one computer processor, cause the at least one computer processor to at least:

define a coverage area for each of the plurality of imaging devices, wherein each of the coverage areas is defined based at least in part on an intersection of a field of view of one of the plurality of imaging devices and a plane at a predetermined distance from the surface;

initiate operations of each of the plurality of imaging devices to capture a depth image at approximately a first time, wherein each of the operations comprises illuminating the field of view of one of the imaging devices by the illuminator of the one of the imaging devices and operating the depth sensor of the one of the imaging devices to capture light reflected from at least a portion of the surface;

calculate, for each of the imaging devices, a ratio of a number of supersaturated pixels within the depth image to a total number of pixels within the depth image;

identify a subset of the imaging devices, wherein each of the imaging devices of the subset captured a depth image having a ratio of the number of supersaturated pixels within the depth image to the total number of pixels within the depth image above a predetermined threshold;

identify a subset of the coverage areas, wherein each of the coverage areas of the subset is defined for one of the imaging devices of the subset; and determine that an actor associated with the supersaturated pixels is within each of the coverage areas of the subset at the first time.

19. The system of claim 18, wherein the instructions further cause the at least one processor to at least:

initiate operations of each of the plurality of imaging devices to capture a visual image at approximately the first time, wherein each of the operations comprises operating the visual sensor of the one of the imaging devices to capture light reflected from at least the portion of the surface;

provide each of the visual images as an input to a machine learning tool operated by one or more processors of the imaging device;

identify a subset of the visual images based at least in part on outputs of the machine learning tools, wherein each of the visual images of the subset depicts at least a portion of an actor;

determine, for each of the visual images of the subset, a range from one of the imaging devices to the portion of the actor; and generate a location map of the scene based at least in part on the visual images of the subset.

20. The system of claim 18, wherein each of the operations comprises capturing, by each of the plurality of imaging devices, a visual image at approximately the first time, and wherein the instructions further cause the at least one processor to at least:

provide at least some of the visual images captured at approximately the first time as inputs to a trained machine learning system;

receive at least one output from the trained machine learning system based at least in part on the inputs; and predict a position of at least a portion of the actor associated with the supersaturated pixels at the first time based at least in part on the at least one output.

* * * * *